(12) United States Patent
Colucci et al.

(10) Patent No.: US 9,114,440 B1
(45) Date of Patent: Aug. 25, 2015

(54) OUTDOOR HOME CLEANING ROBOT—SYSTEM AND METHOD

(71) Applicants: Michael A. Colucci, Ewing, NJ (US); Eusebio G. Hernandez, South Miami, FL (US)

(72) Inventors: Michael A. Colucci, Ewing, NJ (US); Eusebio G. Hernandez, South Miami, FL (US)

( * ) Notice: Subject to any disclaimer, the term of this patent is extended or adjusted under 35 U.S.C. 154(b) by 285 days.

(21) Appl. No.: 13/886,265

(22) Filed: May 2, 2013

(51) Int. Cl.
| | |
|---|---|
| *B25J 5/00* | (2006.01) |
| *G05D 1/02* | (2006.01) |
| *B08B 3/02* | (2006.01) |
| *B25J 9/00* | (2006.01) |
| *B25J 18/00* | (2006.01) |
| *B25J 9/16* | (2006.01) |

(52) U.S. Cl.
CPC .............. *B08B 3/024* (2013.01); *G05D 1/0225* (2013.01); *A47L 2201/00* (2013.01); *A47L 2201/024* (2013.01); *A47L 2201/026* (2013.01); *A47L 2201/04* (2013.01); *B25J 5/00* (2013.01); *B25J 9/1676* (2013.01); *G05D 2201/0203* (2013.01)

(58) Field of Classification Search
CPC ..... A47L 11/00; A47L 11/28; A47L 2201/00; A47L 2201/02; A47L 2201/022; A47L 2201/024; A47L 2201/04; A47L 2201/06; A47L 2201/026; B25J 9/0003; B25J 11/0085; B25J 9/1676; B25J 5/00; G05D 1/02; G05D 2201/0203; G05D 2201/0215; G05D 1/0225; G06F 1/1632
See application file for complete search history.

(56) References Cited

U.S. PATENT DOCUMENTS

| | | | | |
|---|---|---|---|---|
| 5,180,122 | A * | 1/1993 | Christian et al. | 244/134 F |
| 5,318,254 | A * | 6/1994 | Shaw et al. | 244/134 C |
| 5,959,423 | A * | 9/1999 | Nakanishi et al. | 318/568.12 |
| 2003/0030398 | A1* | 2/2003 | Jacobs et al. | 318/568.12 |
| 2003/0030399 | A1* | 2/2003 | Jacobs | 318/568.16 |
| 2003/0156493 | A1* | 8/2003 | Bayer | 367/6 |
| 2006/0184272 | A1* | 8/2006 | Okazaki et al. | 700/245 |
| 2006/0293788 | A1* | 12/2006 | Pogodin | 700/245 |
| 2008/0001005 | A1* | 1/2008 | Weaver et al. | 239/225.1 |
| 2009/0050750 | A1* | 2/2009 | Goossen | 244/76 R |
| 2009/0281661 | A1* | 11/2009 | Dooley et al. | 700/258 |

(Continued)

FOREIGN PATENT DOCUMENTS

DE        102011010205        * 10/2011

*Primary Examiner* — Khoi Tran
*Assistant Examiner* — Dale Moyer
(74) *Attorney, Agent, or Firm* — Stanley H. Kremen

(57) ABSTRACT

A hardware and software method, system and apparatus comprising an autonomous all weather outdoor cleaning robot designed to identify, and clean various outdoor household objects including but not limited to personal automobiles and other vehicles. The robot autonomously navigates to a designated area and scans the vehicle or object to determine the optimum cleaning routine. The robot learns its working environment by comparing scanned vehicles and outdoor objects with its existing database for future reference. The robot also compares and stores navigation data, which correlate to areas previously visited to increase efficiency for future work by reducing travel and scanning times. The Present Invention focuses on autonomous outdoor cleaning multi-purpose robots. The robots utilize microprocessors to control cleaning, navigation and perception. More specifically, the robots use multi-segmented arms to perform needful chores. Even more specifically, a robot can adapt and learn from its environment while performing useful tasks.

21 Claims, 31 Drawing Sheets

(56) References Cited

U.S. PATENT DOCUMENTS

| | | |
|---|---|---|
| 2010/0106298 A1* | 4/2010 | Hernandez et al. ........... 700/250 |
| 2010/0143089 A1* | 6/2010 | Hvass et al. ................... 414/754 |
| 2010/0256812 A1* | 10/2010 | Tsusaka et al. ............... 700/254 |
| 2012/0221187 A1* | 8/2012 | Jeon ............................... 701/26 |
| 2013/0011234 A1* | 1/2013 | Pretlove et al. ............ 414/749.1 |

* cited by examiner

OUTDOOR HOME CLEANING ROBOT—SYSTEM AND METHOD

FIELD OF THE INVENTION

The Present Invention is an autonomous, all weather, outdoor home cleaning robot with multi-function capabilities. Specifically, the Present Invention uses microprocessors and sensors to navigate to an area of operation to perform specific cleaning tasks. More specifically, after navigating to the general area of operation the Present Invention scans the object to be cleaned to determine the best and most efficient cleaning method using its multi-segmented arm(s). Even more specifically, the disclosure of the Present Invention herein concentrates on cleaning personal vehicles, including but not limited to automobiles, small utility vehicles, pickup trucks, and most ride on vehicles in the average home.

BACKGROUND OF THE INVENTION

Robots have been performing useful chores in industry for many decades. More recently, home robots for cleaning, for children, and for entertainment have become more affordable to the average consumer. Small cleaning robots for inside the home have been around for over a decade and are more affordable now than ever before. These small robots usually perform cleaning and vacuuming for rugs and their travel is usually limited to a relatively small area in rooms, and they do not interact with their surroundings. Many military and some scientific robots exist that are semi- or fully autonomous and can learn or navigate through their environment, whether outdoors, indoors, in the air, in space or underwater. These robots are very costly and exceedingly rare. The public cannot afford to purchase them, even more so for the average homeowner. In, addition, military robots employ costly and complex user interfaces.

There is a need in our society to keep personal motor vehicles clean. Cleaning personal home vehicles requires time, effort, inconvenience, and considerable expense when using commercially available sources. Currently, a vehicle can be washed by hand or in a local car wash. Today, the only commercial cleaning systems are large mechanical types installed either outside or within large structures, or as part of freestanding or do-it-yourself car washes. Ownership of these machines is beyond the reach of the average homeowner. Utilizing commercially available car washes is inconvenient because of the time, vehicle wear, and fuel used driving to and from the washing facility. In addition, people risk exposure to hazards, such as missing personal belongings, accidents occurring on the way to the facility, and unforeseen damage to the vehicle. Other than hand-washing one's own vehicle, routinely keeping a personal home vehicle clean has been impractical for the average motorist or homeowner. Therefor a there is an unfulfilled need within the realm of cleaning personal vehicles. Due to the availability of robotics, affordable microprocessors, and computer technology, it is now feasible to design and build a robotic vehicle washing system that is simple, compact and economical enough for private residential use. There is a need for an outdoor personal vehicle-cleaning robot that makes time-consuming and tedious car washing less of an issue.

SUMMARY OF THE INVENTION

The Present Invention is an autonomous, outdoor-indoor, all-weather, terrain versatile, cleaning, utility, and maintenance robot, capable of learning, updating, and storing environmental data, with the ability to utilize various software applications that perform specific tasks on the hardware and consumable materials.

The Present Invention utilizes integrated circuit controlled home vehicle cleaning robots with the apparatus to adapt and learn from its environment and perform specified chores.

The Present Invention comprises a multi-tiered platform framework, a terrain versatile wheeled base housed beneath said multi-tiered platform that moves the multi-tiered platform over a relatively horizontal foundation, an upper section above said multi-tiered platform with independently moving segmented mechanical arms for various cleaning implements, a control section housed within said multi-tiered platform using a wireless and wired digital and analog processing for robotic navigation, obstacle avoidance, transmitting and receiving data for cleaning and maintaining objects. It utilizes two- and three-dimensional environmental learning matrices to control robotic navigation maneuvers. Said environmental data matrices generate a path of efficiency that conserves power and time. Said path of efficiency minimizes sensor errors by use of sensor redundancies and by maximizing obstacle avoidance through use of ultrasonic, infrared, optical, camera imaging, geosynchronous position satellite (GPS) devices, wheel encoders, and mechanical actuators.

DETAILED DESCRIPTION OF THE INVENTION

Figure 1:
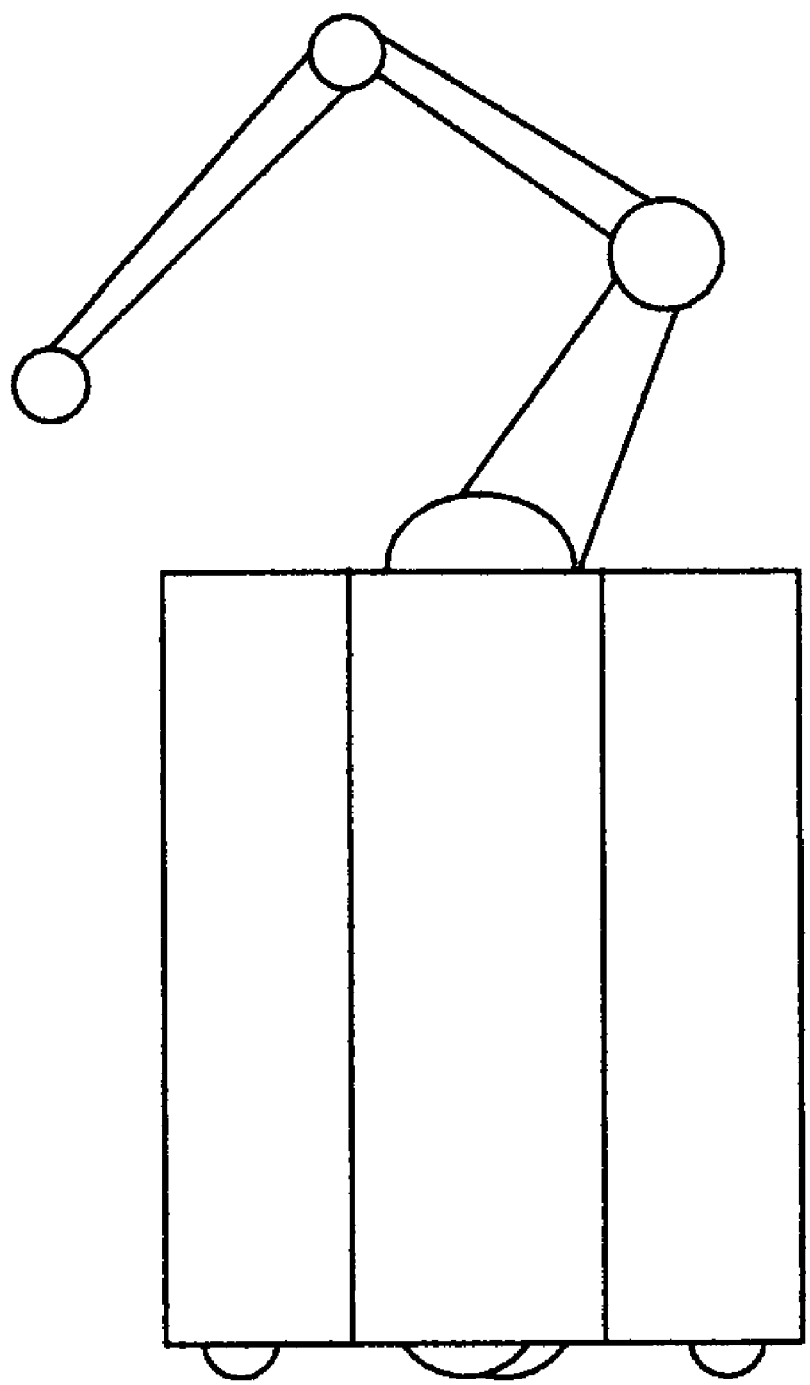
FIG. 1 is a side elevation of an embodiment of the robot of the Present Invention.
Figure 2:
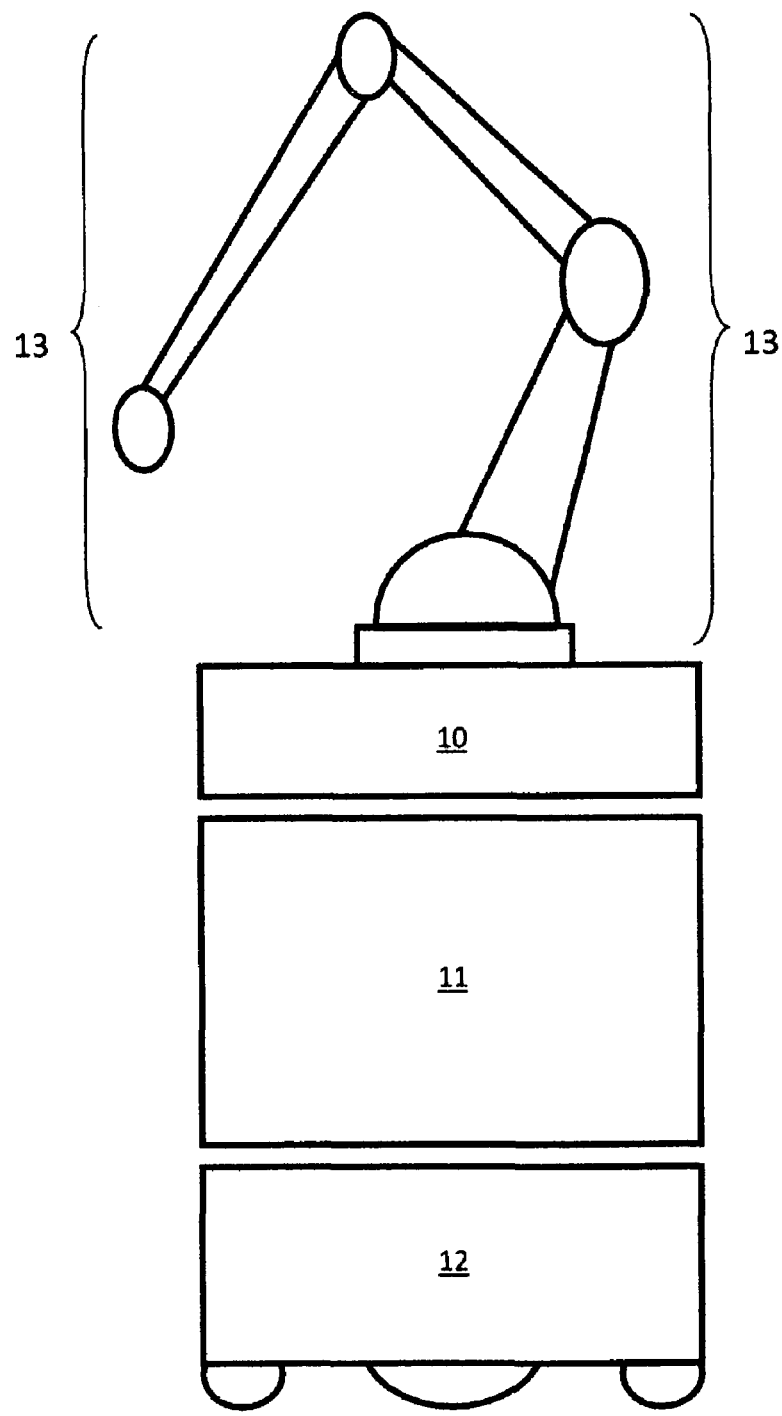
FIG. 2 is a side elevation of the multi-tiered platform

In the Present Invention, an autonomous robot, shown in FIG. 1, is primarily constructed to clean the exterior of home personal motor vehicles effectively. The robotic device will clean the exterior of any .personal motor vehicles. Referring to FIG. 2, the robotic device utilizes a control section 10 to navigate to and from its work area and analyze the motor vehicle or other object to be cleaned upon reaching its work area. The control section is housed within said multi-tiered platform, and uses wireless and wired, digital and analog processing for robotic navigation 33, obstacle avoidance, transmitting and receiving data, and cleaning and maintaining objects using two-dimensional and three-dimensional environmental learning matrices. Two-dimensional environmental matrices refer to probabilistic representations of x-y coordinates (i.e. surface of the Earth orthogonal to gravitational pull wherein x-y coordinates do not correspond to any vertical motion, Three-dimensional environmental matrices refers to x-y-z coordinates (i.e. two-dimensional matrices with integration of vertical coordinates wherein vertical coordinates correspond to the z direction), wherein said robotic navigation maneuvers the robot within said environmental data matrices, and generates a path of efficiency, which conserves power and time. The path of efficiency minimizes sensor errors by use of sensor redundancies by maximizing obstacle avoidance using ultrasonic 19, 53, infrared-(IR) 17, 50, optical camera imaging 20, 51, geo-synchronous positioned satellite (GPS) devices 37, wheel encoders 55 and mechanical actuators 52. Within the control section of the present invention, a tilt control sensor 23 will monitor pitch of the surrounding area and any unsafe weight shift initiating an auto shut down.

Within the art, mobile robots come in different shapes and sizes. Different embodiments of the Present Invention are described herein. However, an exemplary-embodiment of the Present Invention is an octagonal design containing clear aspects as shown in FIG. 1.

In a first embodiment, the Present Invention is configured to scan the exterior of personal home motor vehicles, such as automobiles, small utility vehicles, pickup trucks and motorcycle type vehicles.

Figure 5:
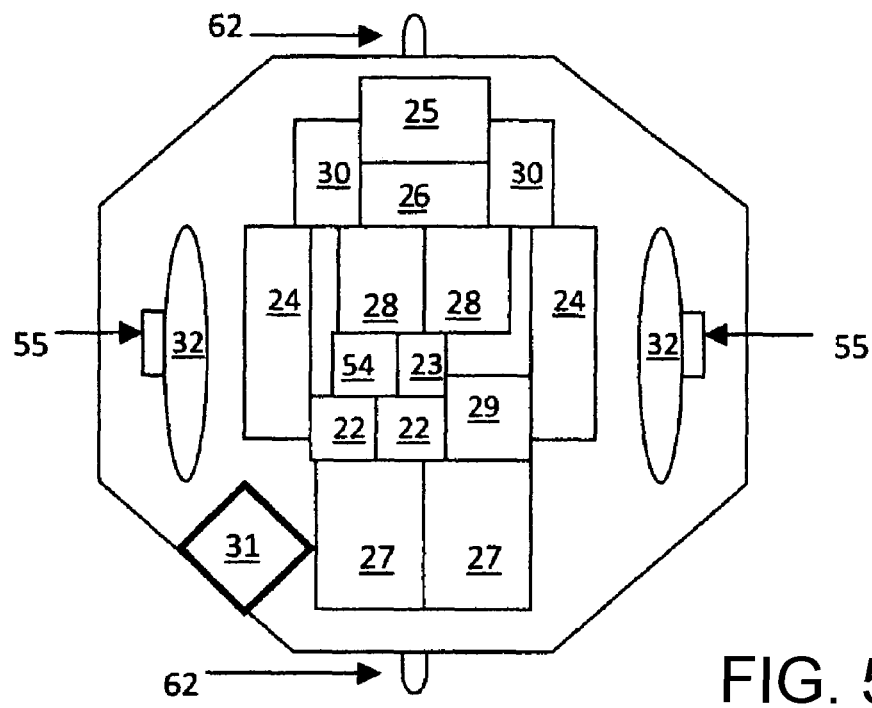
FIG. 5 is a plan view of the drive section of the Present Invention with the operational, control, and containment sections removed.
Figure 6:
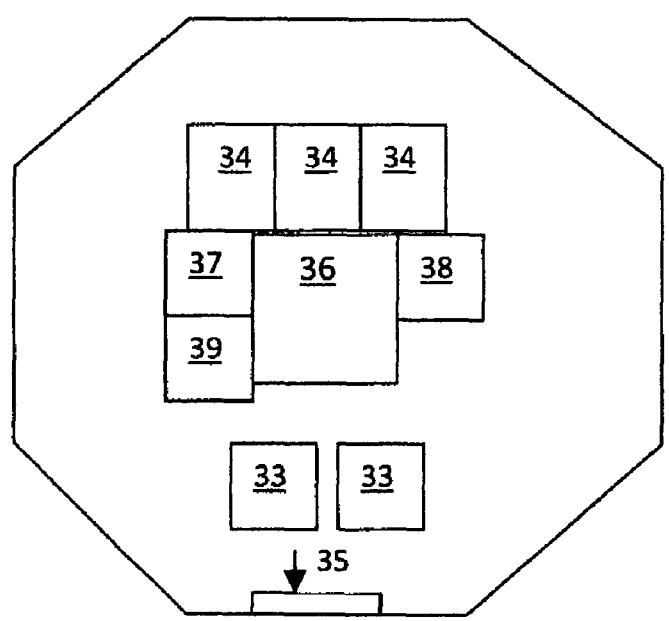
FIG. 6 is a plan view of the control section of the Present Invention with the operational section removed.
Figure 9:
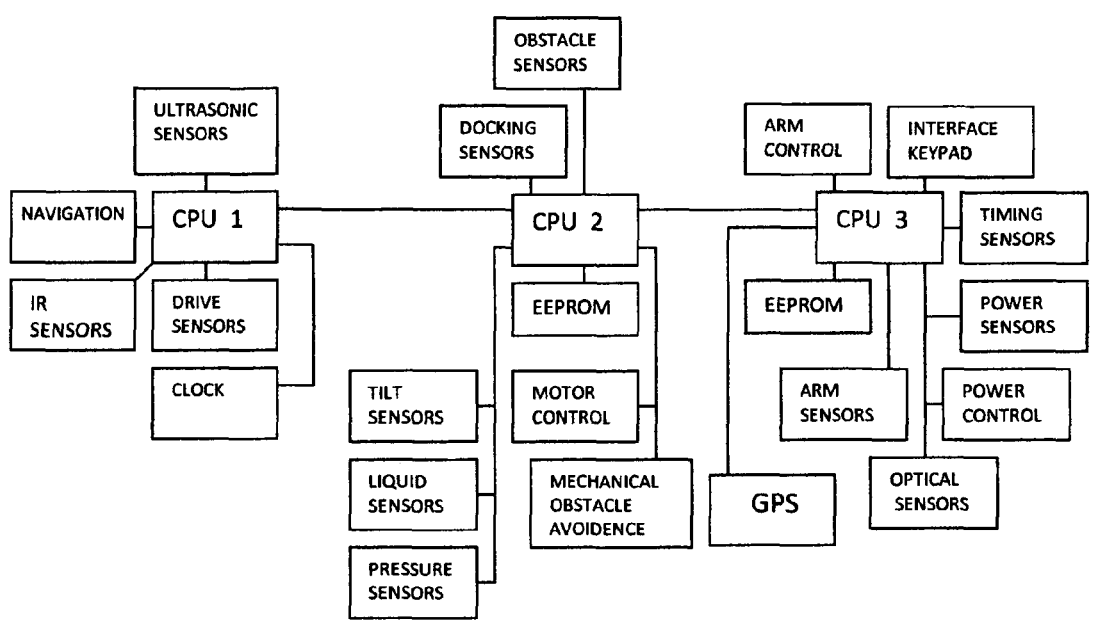
FIG. 9 is a block diagram illustrating the operation of the control system located within the control section
Figure 10:
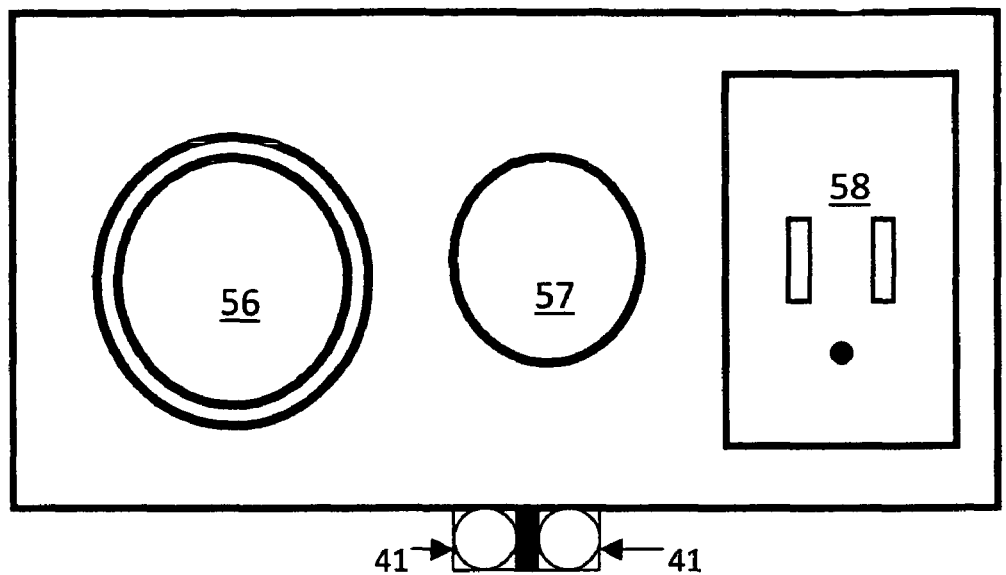
FIG. 10 is a transparent side elevation of an embodiment of the wall docking station adaptor.
Figure 10A:
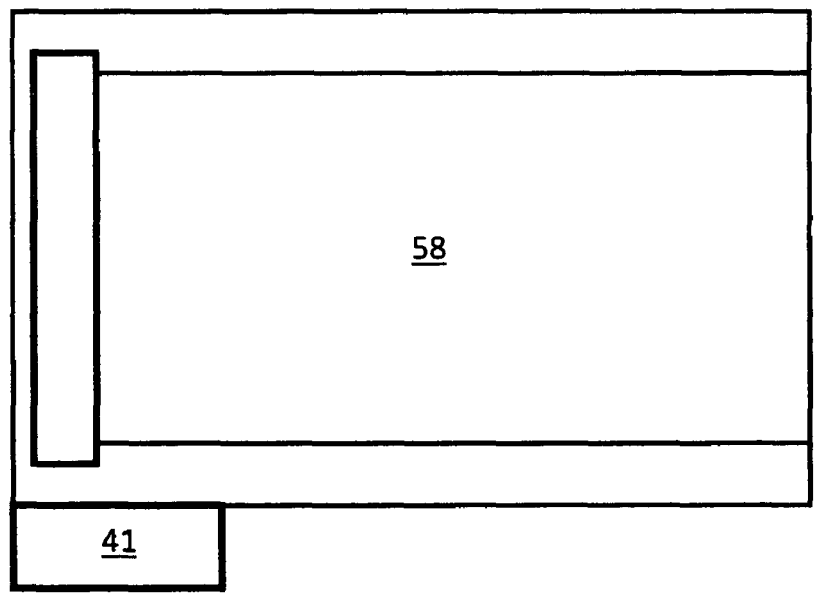
FIG. 10A is a transparent side elevation of the wall docking station adapter.
Figure 10B:
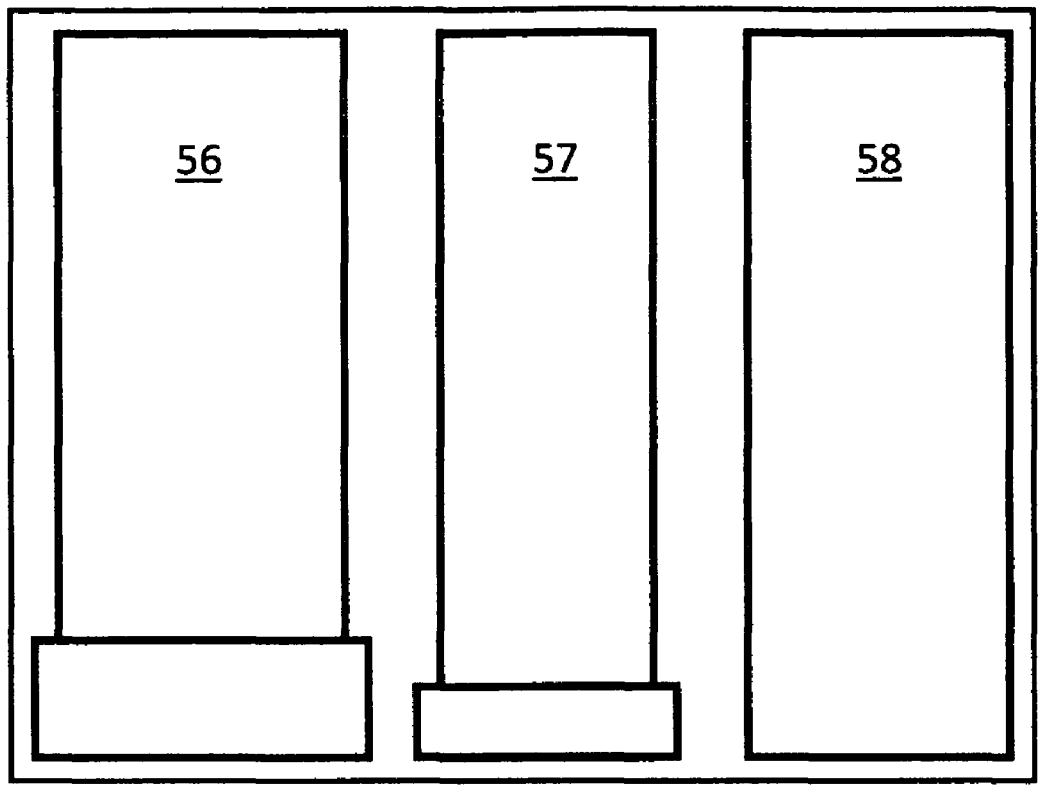
FIG. 10B is a transparent plan view of the wall docking station adapter.

In a second exemplary-embodiment, the Present Invention will comprises a multi-tiered platform framework, with drive section (shown in FIG. 5), which moves the robot along a path of efficiency on an essentially horizontal surface. It includes a control section that transmits, receives and stores data within the multi-tiered platform via the use of multiple microprocessors (refer to FIG. 9).

In a third embodiment, the present invention can be configured- to clean the exterior of boats, outdoor furniture or an easily definable object such as a small shed or outdoor grill, even a small deck. The Present Invention uses a database .that can retrieve pre-loaded matrices of common objects. It can clean immediately, or clean using different programmable schedules, tailored for whatever is to be kept clean. It autonomously completes whatever duty cycle is required and then navigates back to its docking station, where it refills its fluids, replenishes solvents and recharges its batteries without human intervention. With this system, the Present Invention cleans the vehicle when needed. Hereinafter, the term 'duty cycle' refers to the time when the robot awakens, leaves its docking station, navigates to its work area, initiates a scan, starts and completes its cleaning routine, navigates back to its docking station, replenishes power and materials then goes back to sleep.

In a fourth embodiment, the Present Invention can easily be programmed to clean most military land vehicles, such as hummers, trucks, or armored vehicles.

Figure 3:
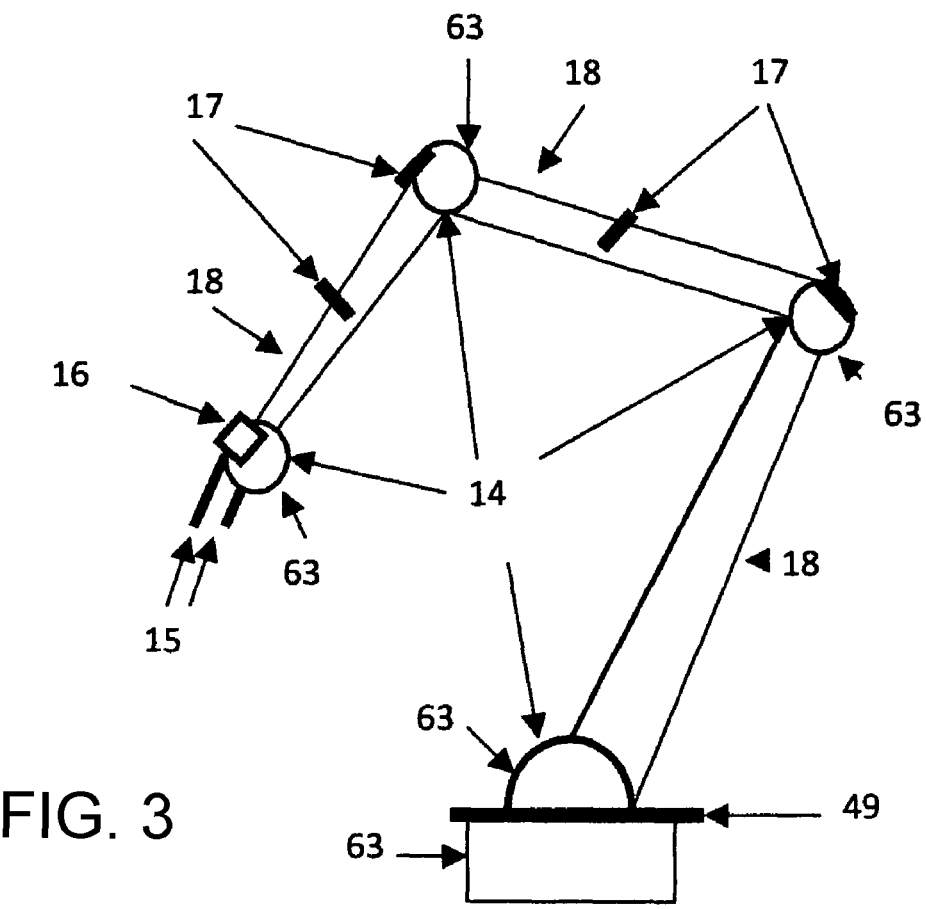
FIG. 3 is a side elevation of an embodiment of an independently moving multi-segmented mechanical arm of the Present Invention.
Figure 4:
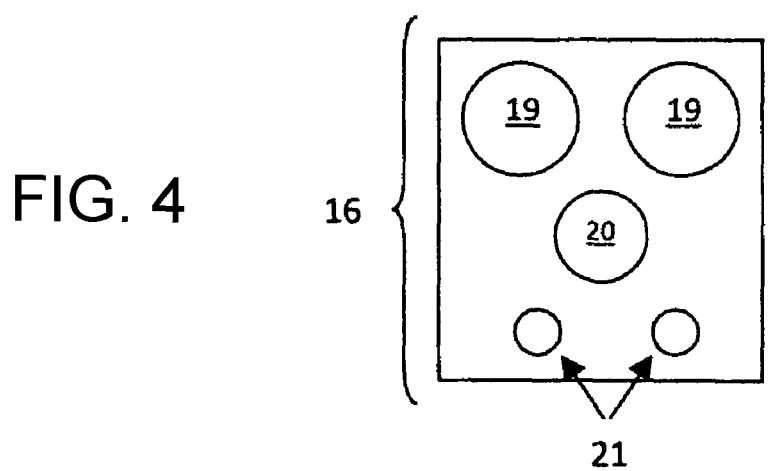
FIG. 4 is a front elevation showing the arm sensor housing.
Figure 11:
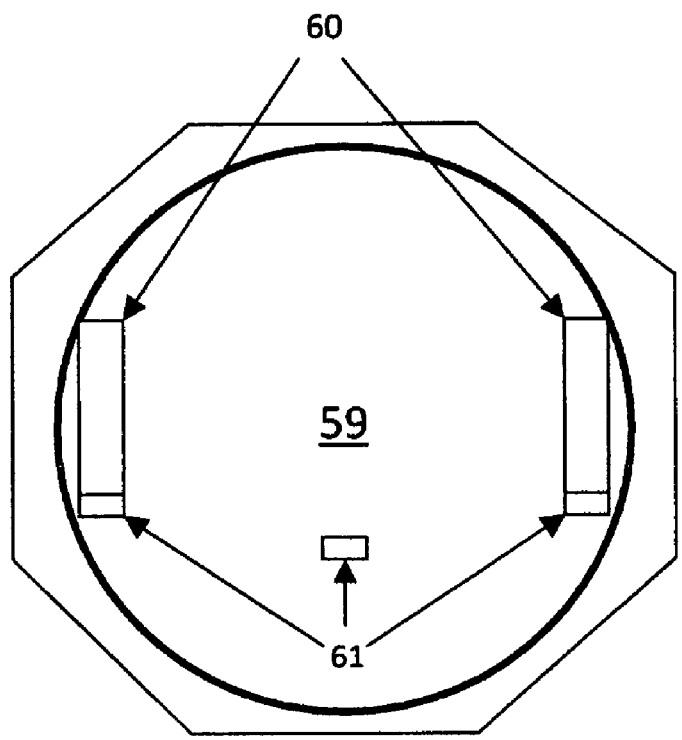
FIG. 11 is a plan view of an exemplary embodiment of the containment section.
Figure 11A:
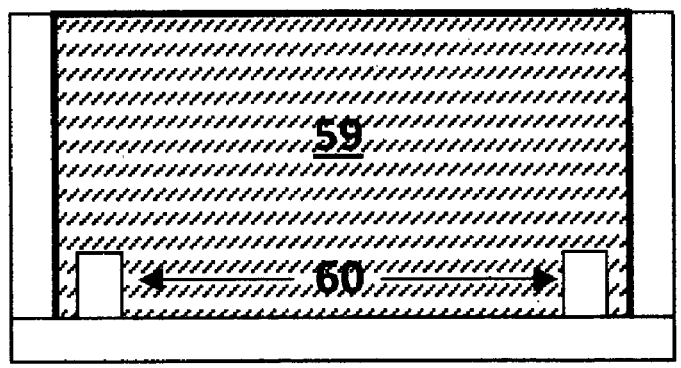
FIG. 11A is a transparent side elevation of the containment section.

Referring to FIG. 11 and FIG. 11A, the Present Invention utilizes a containment section housed within said multi-tiered platform associated with cleaning, utility and maintenance used to control distribution, pressure, temperature, and flow rate of various stored liquids and solvents. The containment section comprises at least two liquid enclosures ranging in storage capacity from 6 oz. to 150 gal. The Present Invention utilizes a 50-gal. water storage tank 59 contained within said multi-tiered platform, which provides water for approximately thirty minutes of continuous water spray at a rate of 1.6 gal./min., one or more solvent/detergent reservoirs, 22, 60, and/or drying agent may be included within the containment section. One enclosure holds water and the other(s) will hold soap or solvents. All water and liquid containers will be monitored with liquid sensors 61, pressure sensors 54, and/or temperature sensors, which signal the control section when liquid levels are critically low or the proper temperature is achieved. The Present Invention uses an electric pressure washer pump assembly 26 to allow a 600-2,500 psi spray to develop through the high-pressure hoses. The Present Invention may also be filled with an air compressor system 25 to blow material off surfaces in a vehicle, building, or any definable object. Referring to FIG. 2 and FIG. 3, the Present Invention maintains a power section housed 12 within said multi-tiered platform, which is used to power the segmented mechanical arm(s), wheels 32, control section and containment section. The power section is co-located with the driving section. It utilizes between two and six deep-cycling gel batteries 27 that provide enough power to complete at least one duty cycle before recharging. These batteries will power items such as drive motors, water pumps, or other high power motors. In addition, there is at least six to twenty-four other rechargeable batteries, 28, 29, 30, such as lead-acid, NiCad, or ion batteries to power components including, inter alia, arm(s), stepper motors, sensors, displays 35, microprocessors, communication devices 38, and other low power items. The power section uses sensors 39 to monitor battery levels and current flow entering and exiting all electrical devices.

The drive section is governed by the control section housed within the multi-tiered platform using power from the power section to maneuver the robot through the horizontal and vertical directions. The Present Invention utilizes two independent DC powered motors 24 with magnetic gear locking mechanisms that engage in the event of sudden power loss or obstacle detection (avoidance). All-terrain non-pneumatic rubber tires are fitted to each wheel axle 32 in addition to heavy-duty all-terrain casters 62 with sealed bearings mounted on the front and rear of the drive section chassis. The robot maintains a low speed horizontally—generally under 2 ft./sec. This allows the robot to move precisely and avoid any potential hazards.

Figure 7:
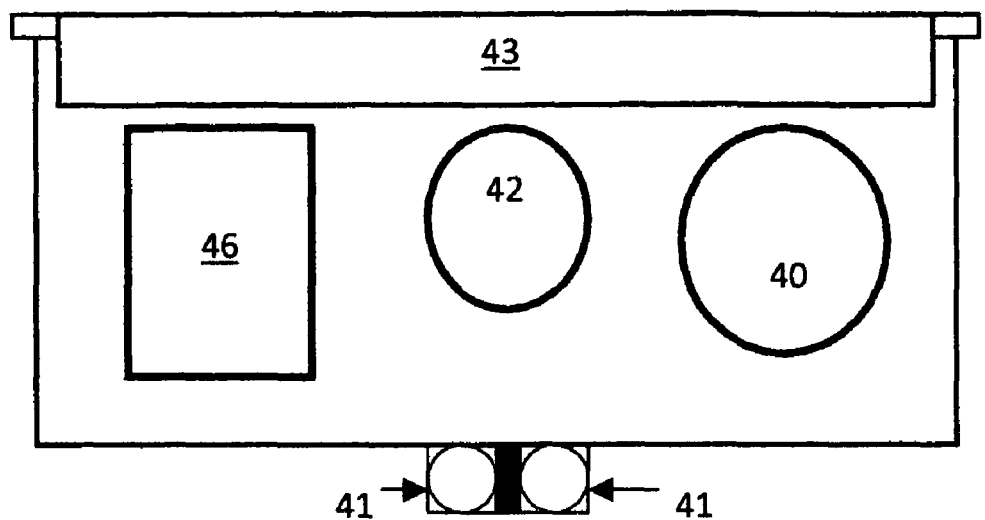
FIG. 7 shows an embodiment of the internal docking mechanism of the Present Invention.
Figure 7A:
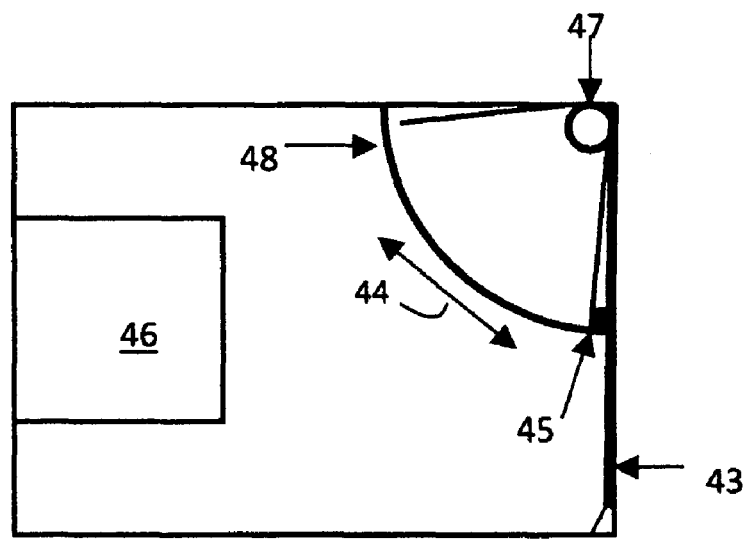
FIG. 7A is a transparent side elevation of the docking mechanism.
Figure 8:
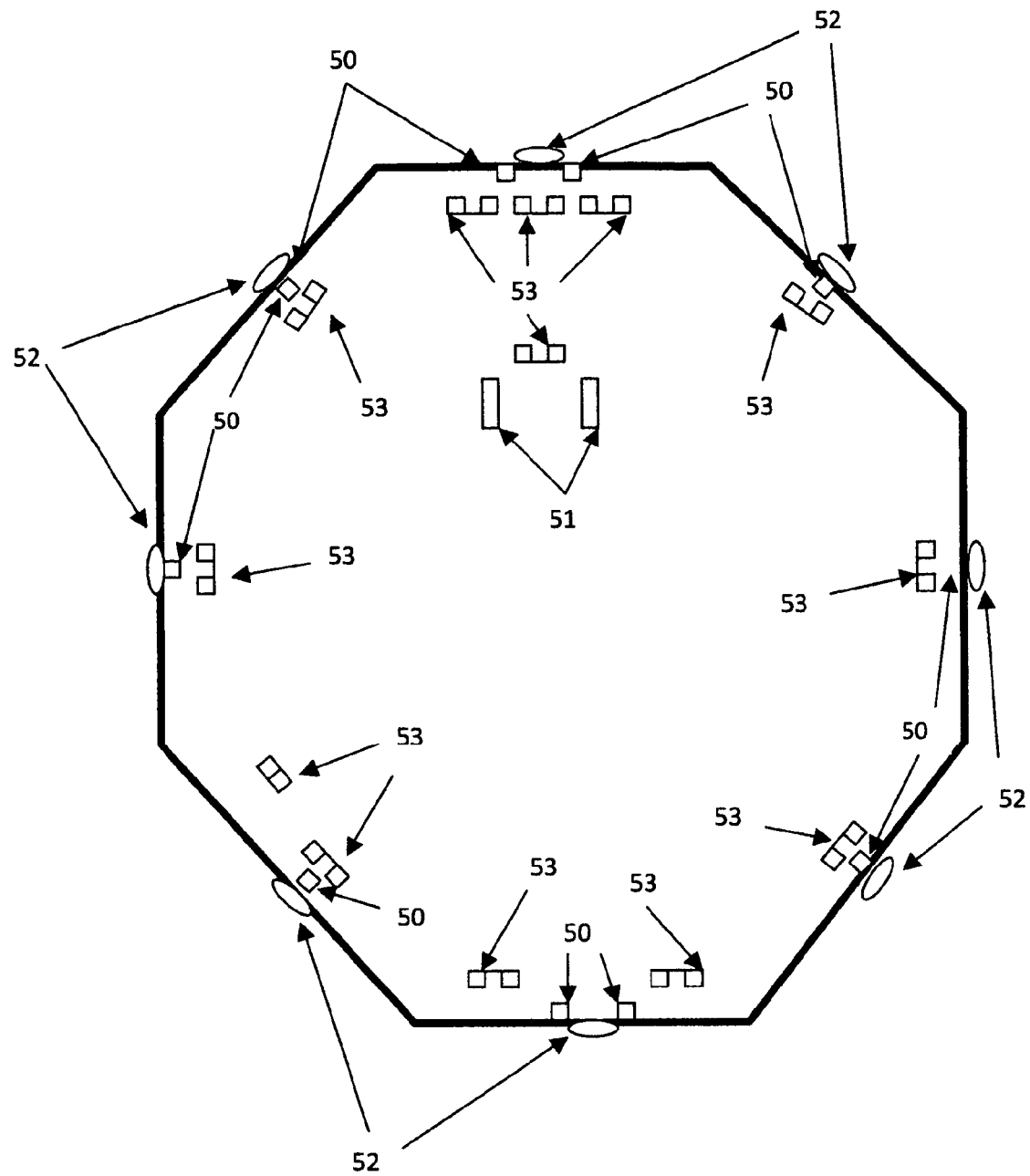
FIG. 8 is a transparent plan view showing an embodiment of the Present Invention having a plurality of sensors around and within the multi-tiered platform.

Referring to FIG. 7 and FIG. 7A, the docking section, housed within said multi-tiered platform is used to replenish power from the power section 46 and replenish liquid 40 and solvents 42 from the containment section. It permits battery recharging and fluid replacement through the use of a coupler assembly 31 shielded by a tension activated waterproof cover 43, which moves in an essentially vertical path 44, directed by a guide pin 45 that moves along a guide track 48 regulated by a tension spring device 47. Internal integrated circuits provide regulation of electrical flow. The external docking section may be mounted on most walls that use standard 120-volt electrical outlets for recharging. Water may be replenished through standard water outlets. The docking section coupling device maintains at least electrical 58, water 56, and solvent 57 adapters, with mating openings for attachment to the external wall docking station.

Referring to FIG. 2, the operational section 13 located directly above the multi-tiered platform is designed to carry out instructions transmitted from the control system using independently moving multi-segmented mechanical arms. These arms will use at least five stepper motors 63 located within each cylindrical motor housing 14 for accurate movement and for the use of at least one high pressure spraying system 15 to remove debris.

Referring to FIG. 3, the first segment of the independently moving segmented mechanical arm(s) are mounted on a metallic plate 49, whose base 36 is connected to a stepper motor, thus allowing it to rotate 360° about the horizontal plane. Another motor connects the upper position of the turntable to the bottom of the principal base housing. This moves first segment up to 180° about the vertical plane. The second segment 18 is connected to the end of the first segment within a cylindrical motor housing 14, allowing this segment to also move up to 270° about the vertical plane. The fourth segment 18 is connected to the end of the third segment with another motor, which allows this segment to move up to 270° about the vertical plane. This fourth segment also accommodates various cleaning attachments, including but not limited to one or more spray nozzles, brushes, proximity sensors, ultrasonic sensors, optical sensors, and/or infrared sensors. The independently moving segmented mechanical arm(s) also contain all necessary equipment for the stepper motors, sensors, and hoses leading up to the cleaning apparatus within the arm(s). The multi-segmented mechanical arms also move at a moderate to slow pace in order to provide the maximum torque and high efficiency cleaning.

Figure 12:
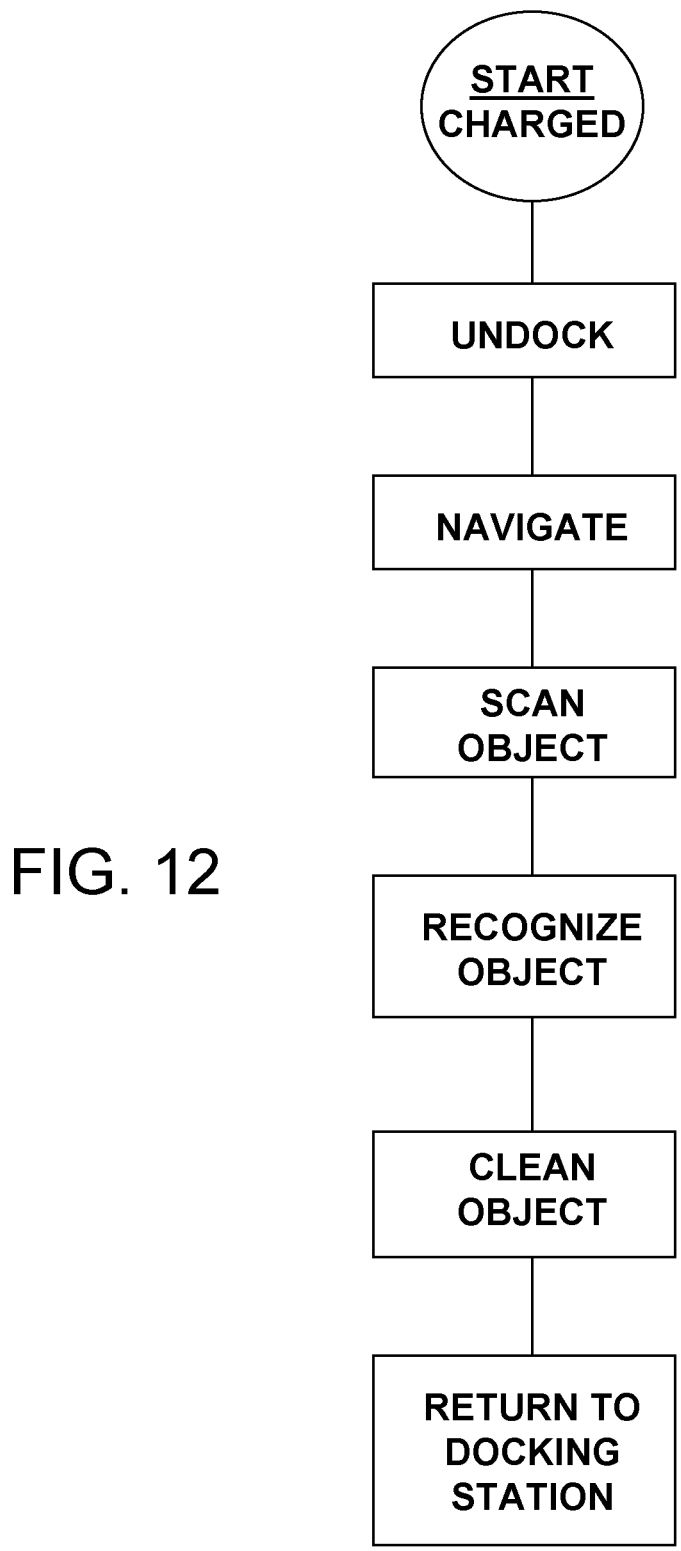
FIG. 12 shows a sequential flow chart of the method employed by the hardware and software that controls the robotic cleaning of objects in the Present Invention.

FIG. 12 is a flow chart showing the overall sequence of steps in the method of the Present Invention.

- When not in use, the robot "sleeps." During the sleep cycle, the robot resides in a docking station and is plugged into an electrical outlet where it is recharged.
- The robot will not awaken until it is sufficiently charged.
- The robot will also continue to "sleep" if there are no tasks for it to perform.
- If the robot has a sufficient electrical charge and a task is scheduled, the robot will automatically leave the docking station.
- During the "wake-up" sequence, the robot will check all battery levels, fluid levels, sensors, scanners, etc.
- The robot will be informed of a prescribed area to which it will navigate. This will occur either via manual input or by sensing various monuments. Sensing may be done using laser optics, ordinary light optics, infrared sensors, ultrasound sensors, etc. For example, if the robot emits a laser beam, the monument can be a corner cube that reflects the laser back along the same line of sight. The distance to the monument may be measured by the robot's computer software as can the angle that the robot must move to reach the monument. In an exemplary embodiment, the robot navigates and moves to the monuments in sequence until it reaches a "start" position.
- Once it reaches the "start" position, the robot will scan the entire prescribed area to find the variety of objects to be cleaned or maintained.
- Using a database management system and pattern recognition software, the robot will identify and classify each object of the variety of objects to be cleaned or maintained. Different objects will require the robot to perform different cleaning or maintenance steps.
- When an object is found and identified within the prescribed area, the robot will scan all sides of the object to obtain a three-dimensional view.
- The robot will automatically clean or maintain each object of the variety of objects with its movable segmented arm having spray nozzles that spray liquid, and using a set of pre-programmed instructions.
- During the cleaning or maintenance step, if the robot determines that the fluid levels are low, it will automatically return to the docking station to replenish. However, it will not go to sleep at this time. Once the fluid levels are replenished, the robot will navigate to the prescribed area once again to complete cleaning or maintenance.
- After cleaning or maintenance is complete, the robot will automatically return to the docking station for electrical recharging and replenishment of soap, water, and solvents.
- Finally, the robot will go back to sleep and await further instructions until it is time to reawaken.

Figure 13:
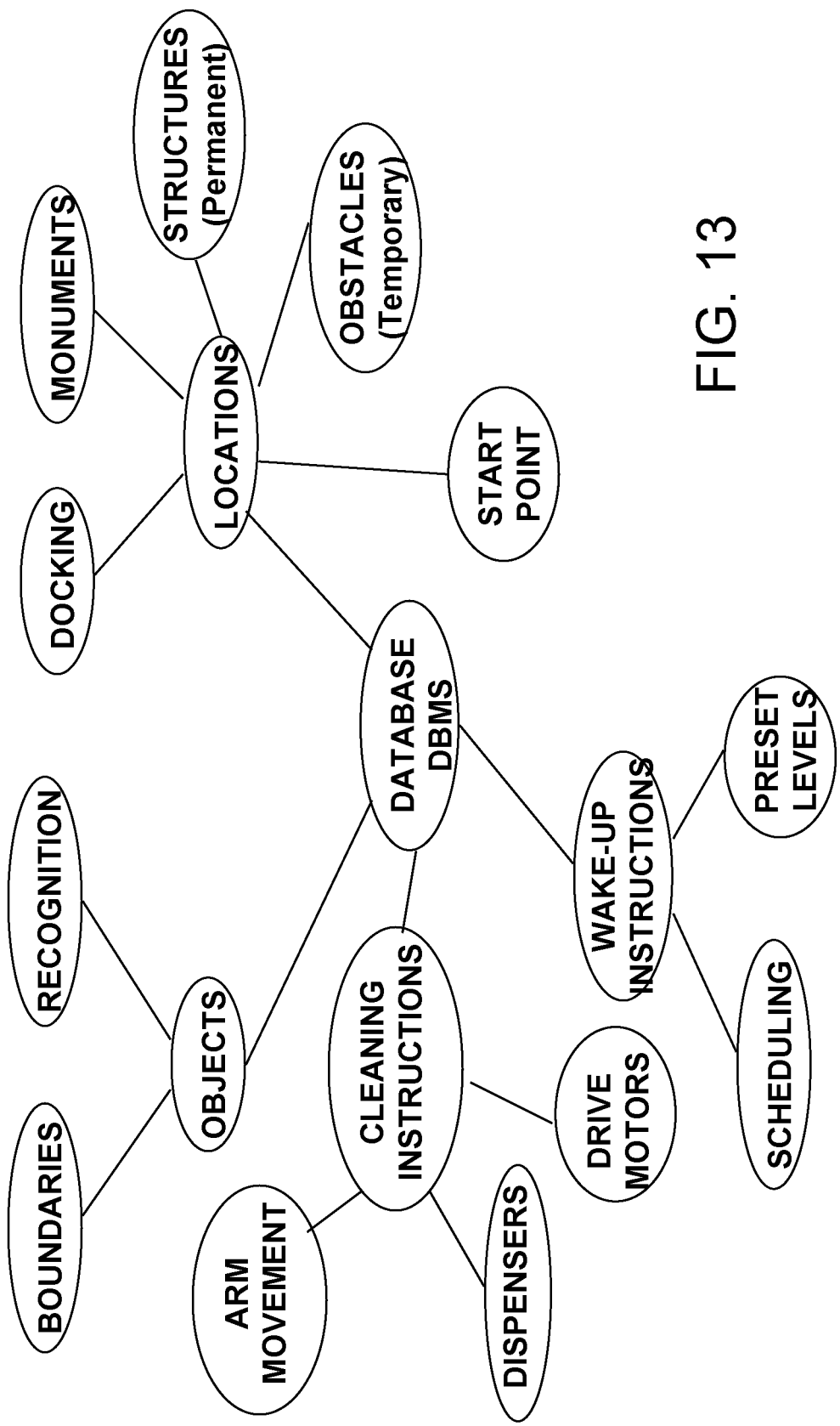
FIG. 13 illustrates a relational database schema of an exemplary embodiment of the data structure used by the Present Invention.

FIG. 13 is a relational schema showing how data is stored in an exemplary embodiment of the Present Invention. The database management system (DBMS) primarily stores three classes of data.

1. wake-up instructions,
2. location data,
3. object data, and
4. cleaning instructions.

Within the wake-up data files are stored scheduling and presets. Within the location data files, the positions of the docking station, monuments, permanent structures, obstacles, and the start point of the prescribed area are stored. Within the object data files are stored the two- and three-dimensional boundaries and pattern recognition data. Within the cleaning instructions are stored arm-movement instructions, fluid dispenser information and instructions, and drive motor instructions for movement of the robot.

Software Flow Charts:

The remaining drawings are used to describe the software associated with the processes and apparatuses that are the subject of this invention. The method of representation used therein is HIPO, an acronym that stands for Hierarchy plus Input—Process—Output. It was developed at IBM during the 1970's, and it has been widely used for software documentation. Its methodology is described in a 1975 IBM published document:

International Business Machines Corporation, "HIPO—A Design Aid and Documentation Technique," IBM Corporation Technical Publications, GC20-1851-1, White Plains, N.Y., 1975

HIPO diagrams and flow charts are rarely used today to construct software programs. This is due to the fact that during the 1970s and 1980s, HIPO was applicable to top-down structured programming. Today, the standard software construction technology used object-oriented programming. However, despite the fact that HIPO is no longer used to create software, it provides an excellent tool for showing the modular construction and modular program flow of a software system. However, a person having ordinary skill in the art of software analysis, design, and programming should be able to construct a software system from HIPO diagrams describing the system without undue experimentation.

HIPO diagrams comprise hierarchy charts and an IPO charts. Hierarchy charts resemble corporate organization charts and they illustrate the call levels of the modules that are comprised within the software package. In a hierarchy chart, each module is represented by a box. If a particular module is a reusable subroutine, a blackened triangle appears in the upper right corner of the box. Hierarchy charts may have sub-hierarchy charts.

An IPO chart illustrates the program sequence for a single module. Usually, each module shown in a hierarchy chart has its own IPO chart, but this is not always the case. The program flow of some software modules is so simple and obvious so as to make inclusion of an IPO chart unnecessary. In addition, a software system may comprise commercially available or state-of-the-art software modules. In those instances, IPO charts would not be shown. In the Present Application, an IPO chart for the DATABASE MANAGEMENT component (Module 5.0) is not presented because database management systems are commercially available, and the selection of the particular database is not critical to the Present Invention. Similarly, an IPO chart for the PATTERN RECOGNITION software (Module 3.3.1.1) is not presented because many different state-of-the-art pattern recognition programs may be used, and the selection of a particular program is not critical to the Present Invention.

An IPO Chart comprises three main components—an INPUT component, a PROCESS component, and an OUTPUT component. The PROCESS component is central to the diagram. Within that component, the programming steps are presented sequentially as overview pseudocode. For each step, INPUT (if any) and OUTPUT (if any) is shown. Standard HIPO flowchart symbols are used for INPUT and OUTPUT. (NOTE: HIPO flowchart symbols are not the same as standard computer program flowchart symbols.)

Figure 14:
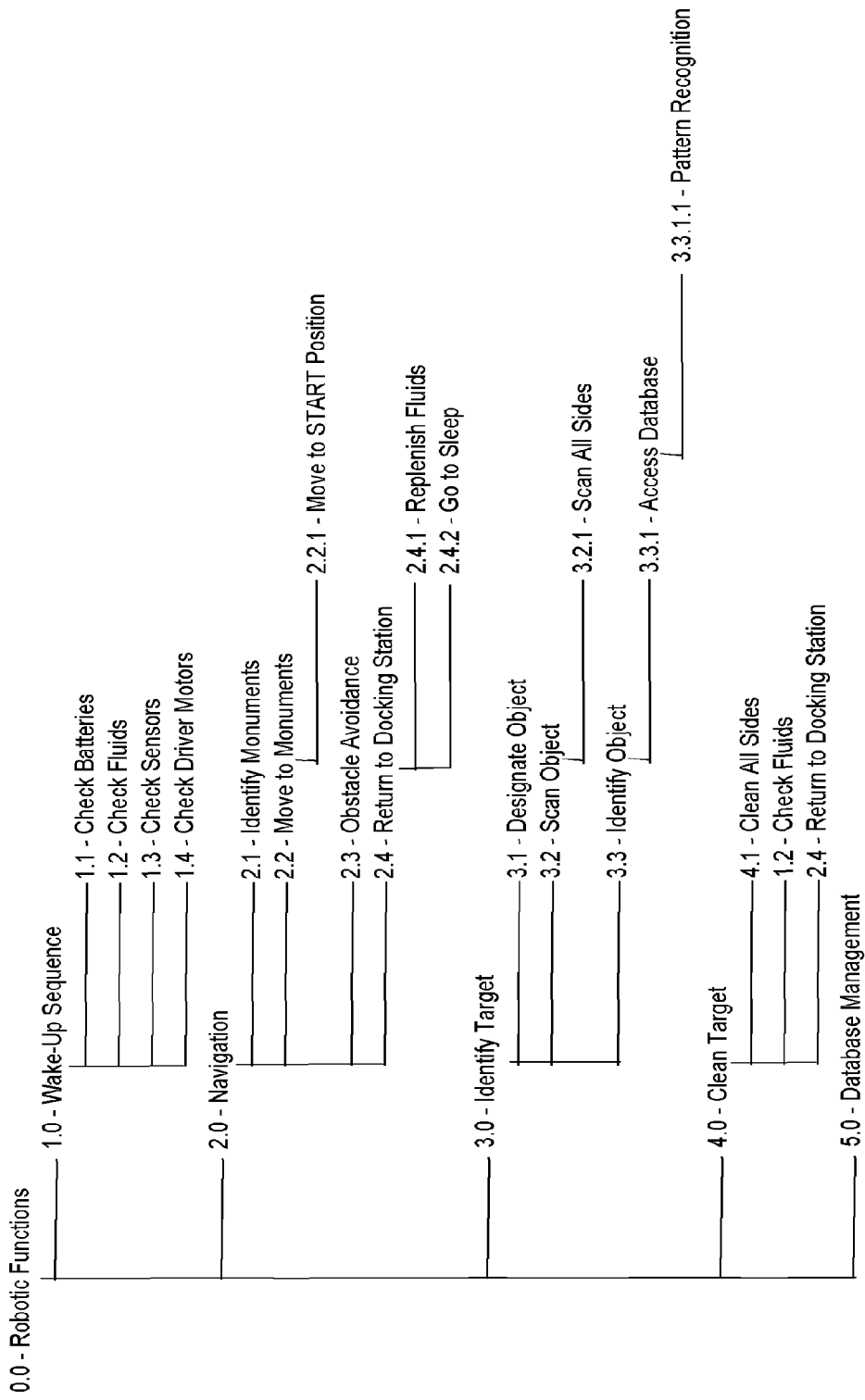
FIG. 14 illustrates a complete hierarchical overview of an exemplary embodiment of the software that controls the robotic functions of the Present Invention.

FIG. 14 shows an exemplary embodiment of the overall hierarchy of the software residing in the computer memory of the robot. The hierarchy chart shows a modular design of the software. However, it does not show the sequence of steps, as is shown by example in FIG. 12. During execution, the higher-level software modules invoke lower-level software modules, which in turn invoke even lower-level modules. FIG. 14 illustrates the hierarchy of the entire software system.

Figure 15:
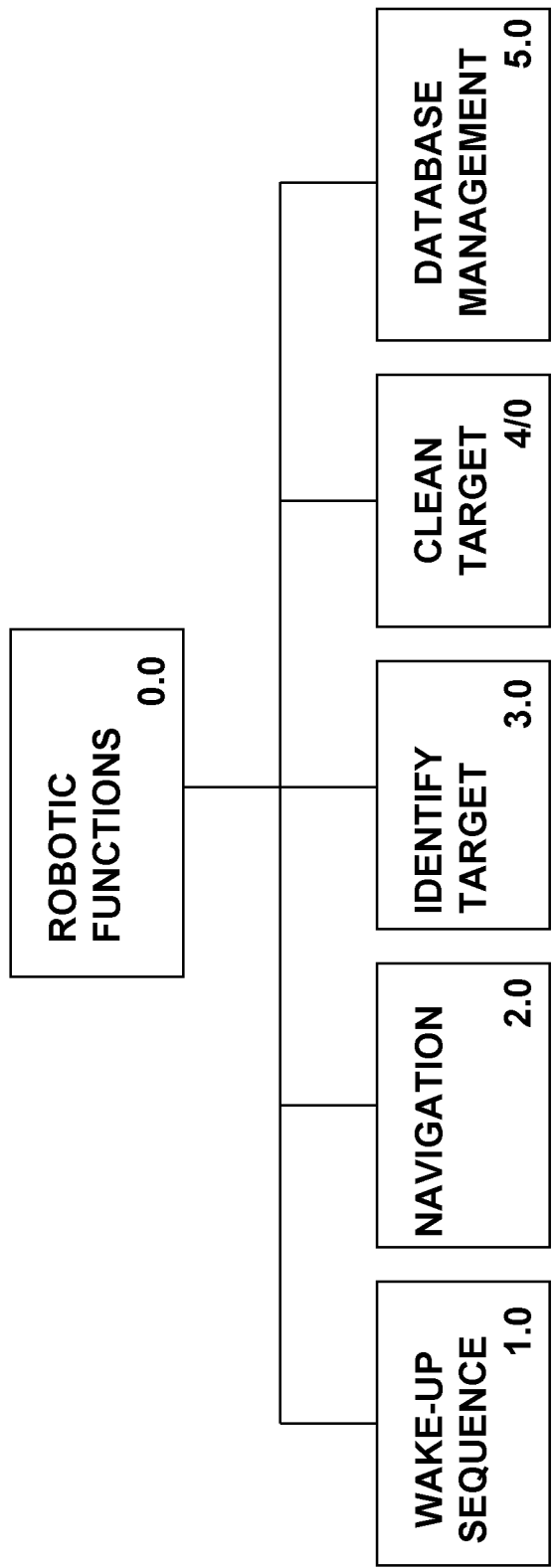
FIG. 15 illustrates the top-level hierarchy of the software of FIG. 14.

FIG. 15 shows the highest-level hierarchy of the software embodiment shown in FIG. 14. The computer software divides the robotic functions into five main modules:

1.0 WAKE-UP SEQUENCE,
2.0 NAVIGATION,
3.0 IDENTIFY TARGET,
4.0 CLEAN TARGET, and
5.0 DATABASE MANAGEMENT.

Module 5.0 will not be discussed in detail in the Present Application. Many state-of-the-art database management systems (DBMS) are currently available. Any of these systems could be used in the Present Invention. Among the functions of any DBMS would be adding, updating, and deleting records, and associating data files with one another. FIG. 13 shows the schema of a relational database that could be used in the exemplary embodiment discussed herein. However, any commercially available or custom DBMS could be utilized, whether or not it is relational in nature. The remaining modules, i.e., 1.0-4.0, when executed, perform the functions shown in FIG. 12 as described herein.

Figure 16:
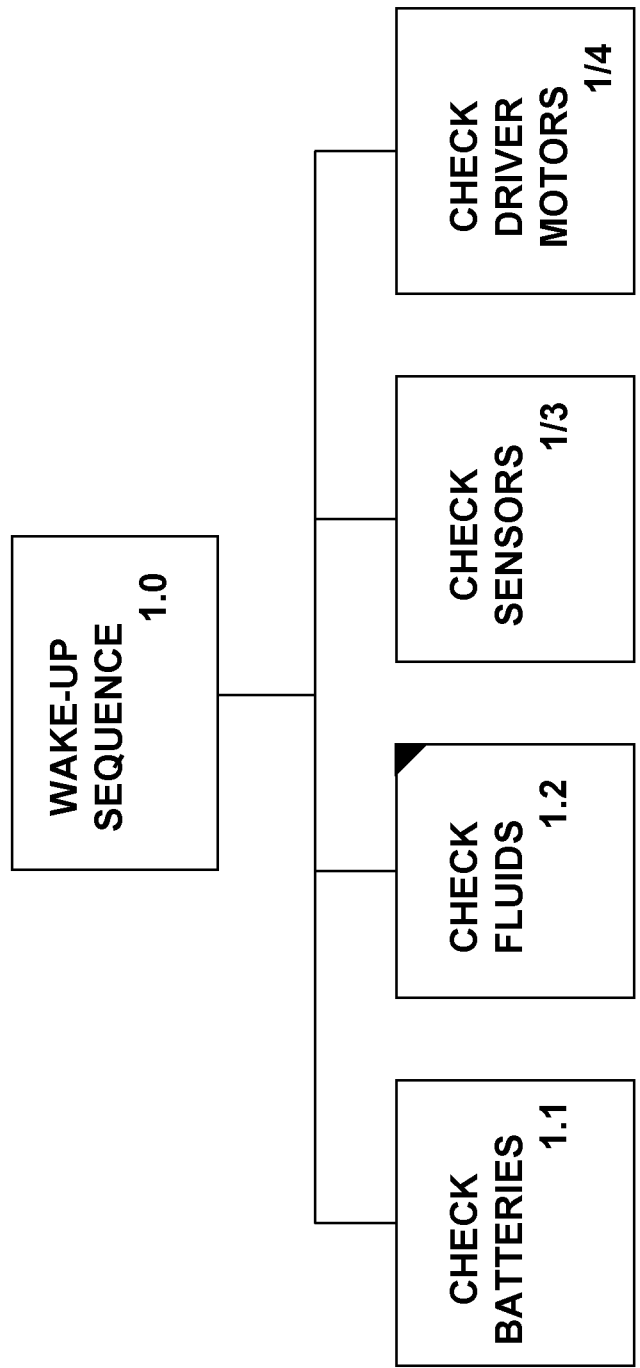
FIG. 16 illustrates the hierarchy of the WAKE-UP SEQUENCE software module and its sub-modules of FIG. 14.

FIG. 16 illustrates the hierarchy of the WAKE-UP SEQUENCE (Module 1.0). Essentially, before the robot leaves its docking station, the computer software must check whether the batteries have sufficient charge, whether the robot has sufficient fluid levels, whether the sensors are working properly, and whether all driver motors are functional.

Figure 17:
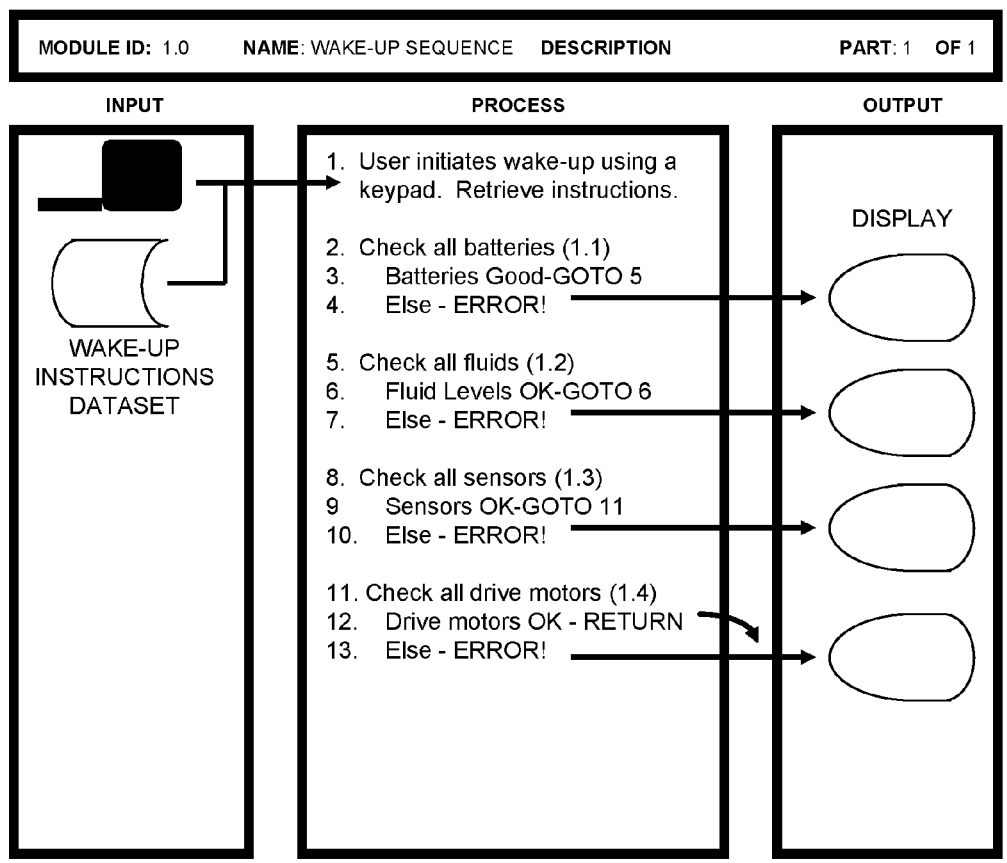
FIG. 17 is an IPO Chart of the WAKE-UP SEQUENCE software module.

FIG. 17 is an IPO chart describing the modular construction of the WAKE-UP SEQUENCE Module 1.0.

Figure 18:
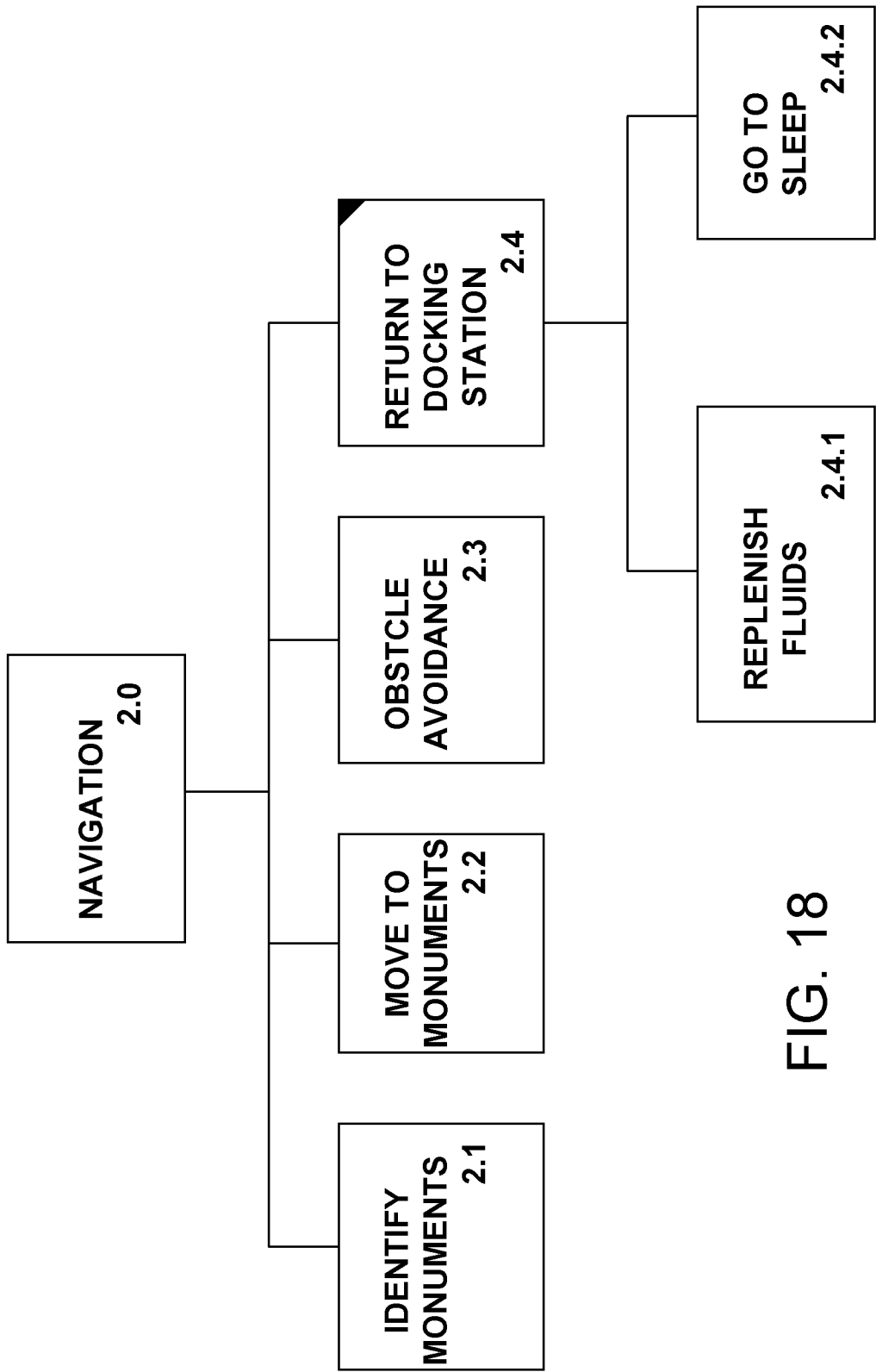
FIG. 18 illustrates the hierarchy of the NAVIGATION software module and its sub-modules of FIG. 14.
Figure 19:
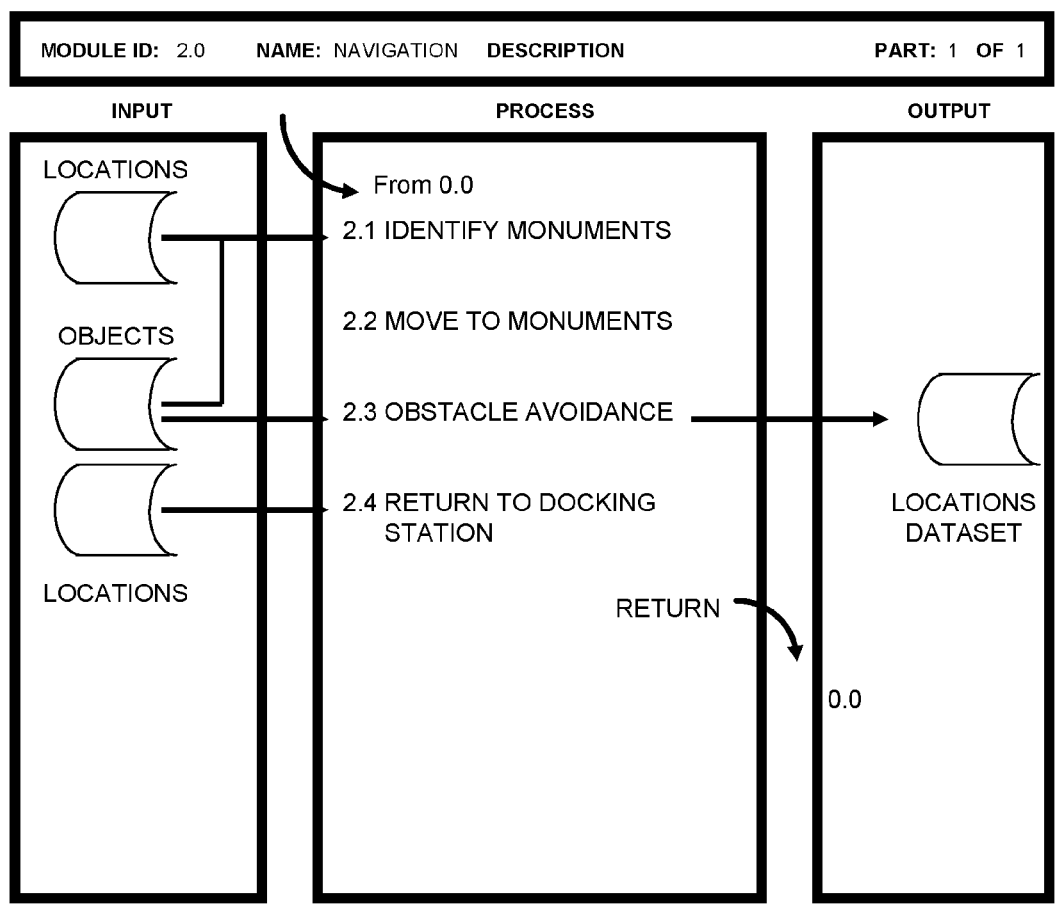
FIG. 19 is an IPO Chart of the NAVIGATION software module.
Figure 20:
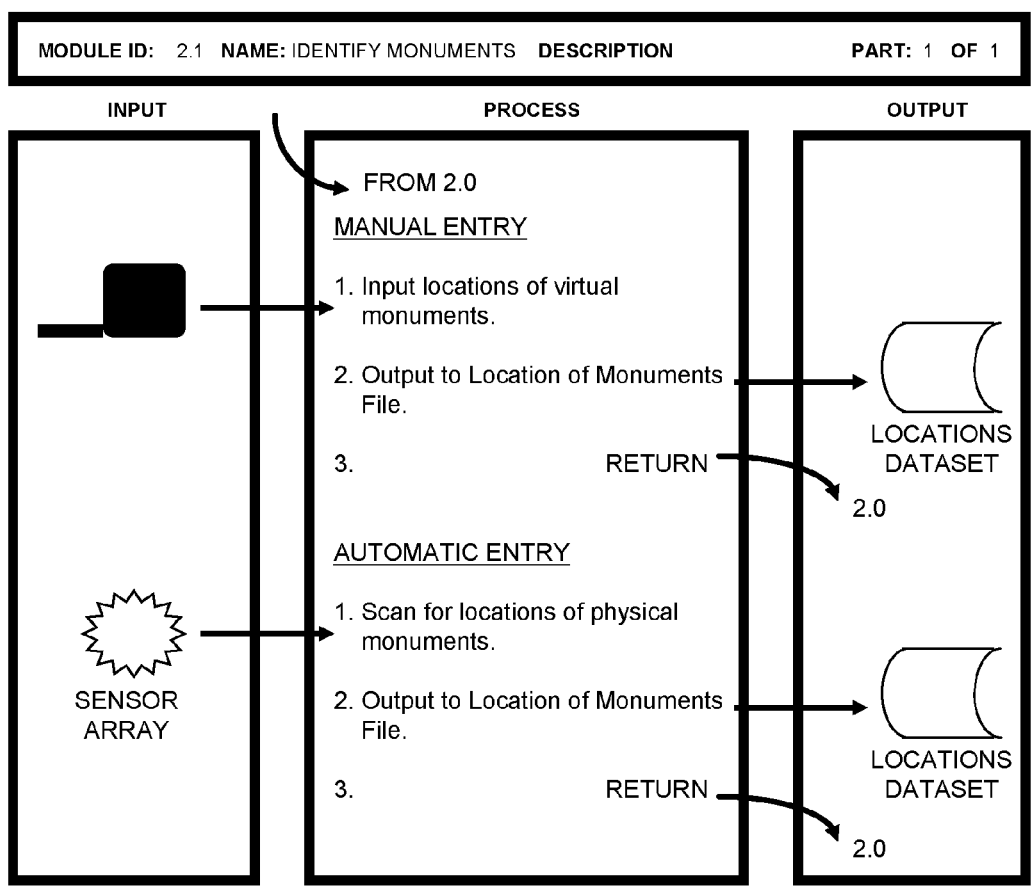
FIG. 20 is an IPO Chart of the IDENTIFY MONUMENTS software module, which is a sub-module of NAVIGATION.
Figure 21:
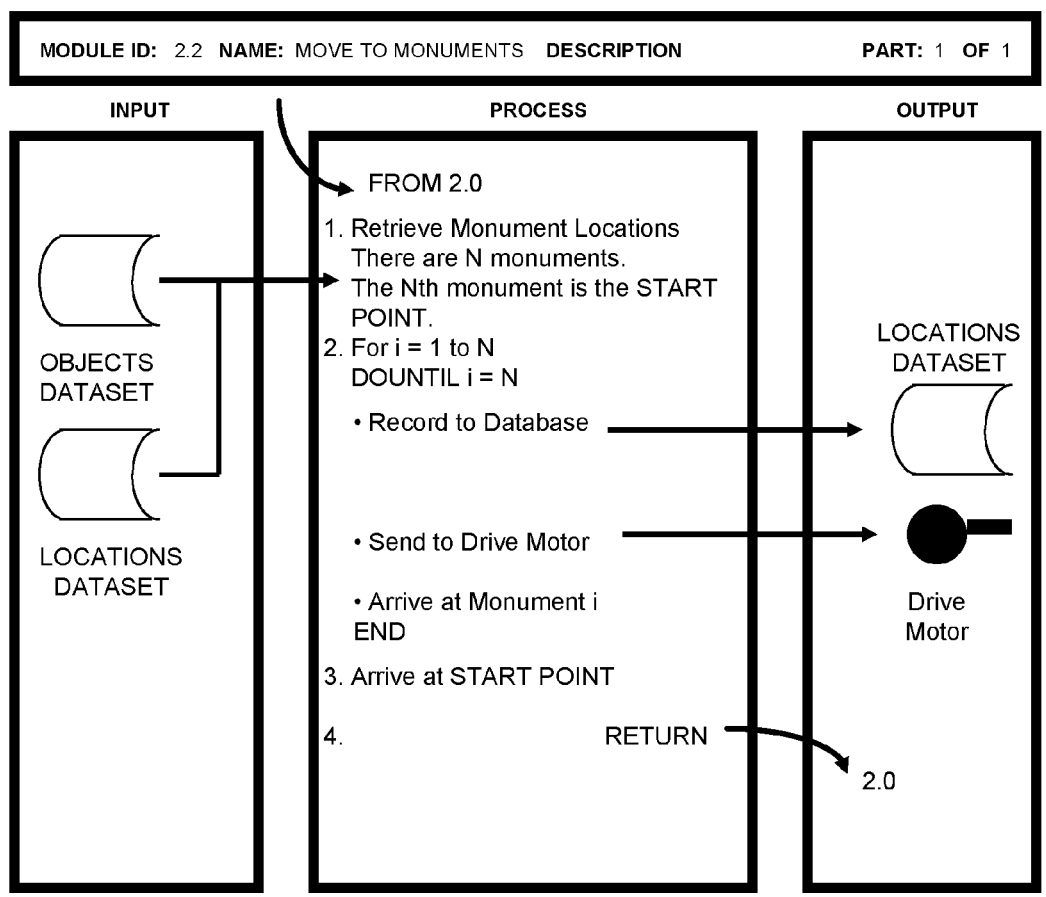
FIG. 21 is an IPO Chart of the MOVE TO MONUMENTS software module, which is a sub-module of NAVIGATION.
Figure 22:
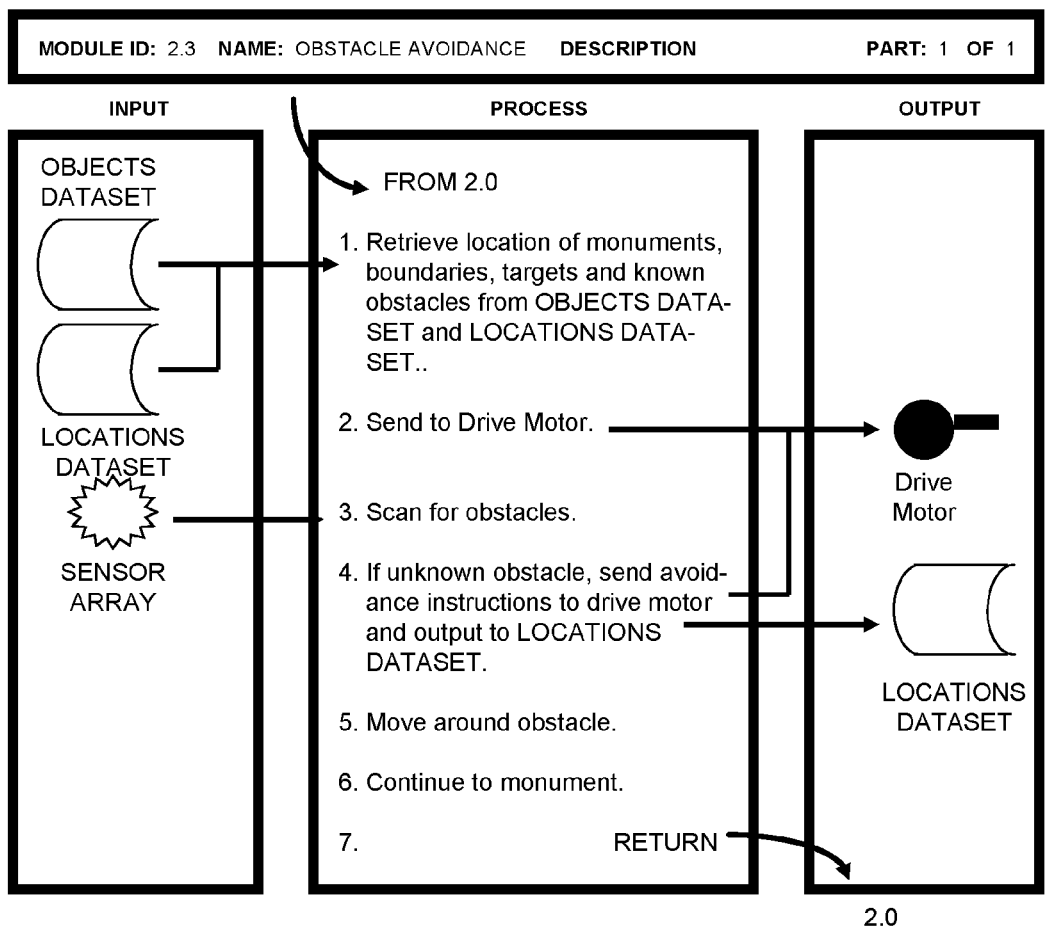
FIG. 22 is an IPO Chart of the OBSTACLE AVOIDANCE software module, which is a sub-module of NAVIGATION.
Figure 23A:
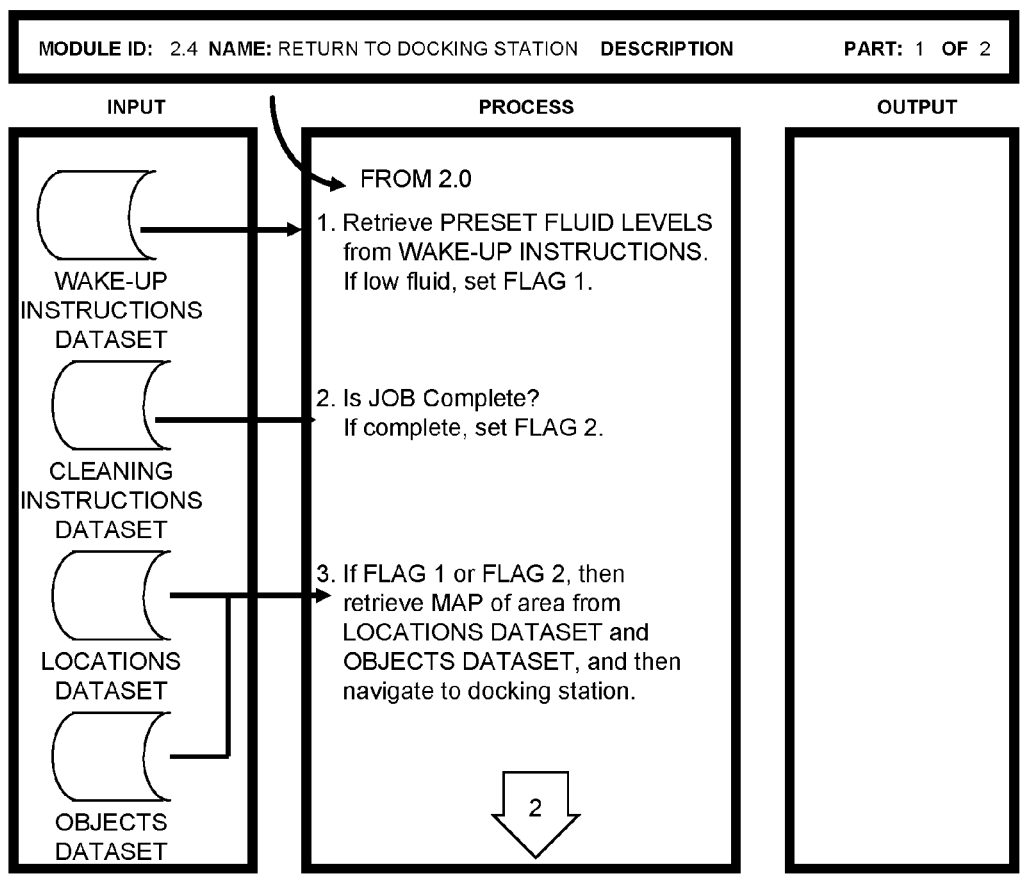
FIG. 23A and FIG. 23B are two parts of a single IPO Chart of the OBSTACLE AVOIDANCE software module, which is a sub-module of NAVIGATION.
Figure 23B:
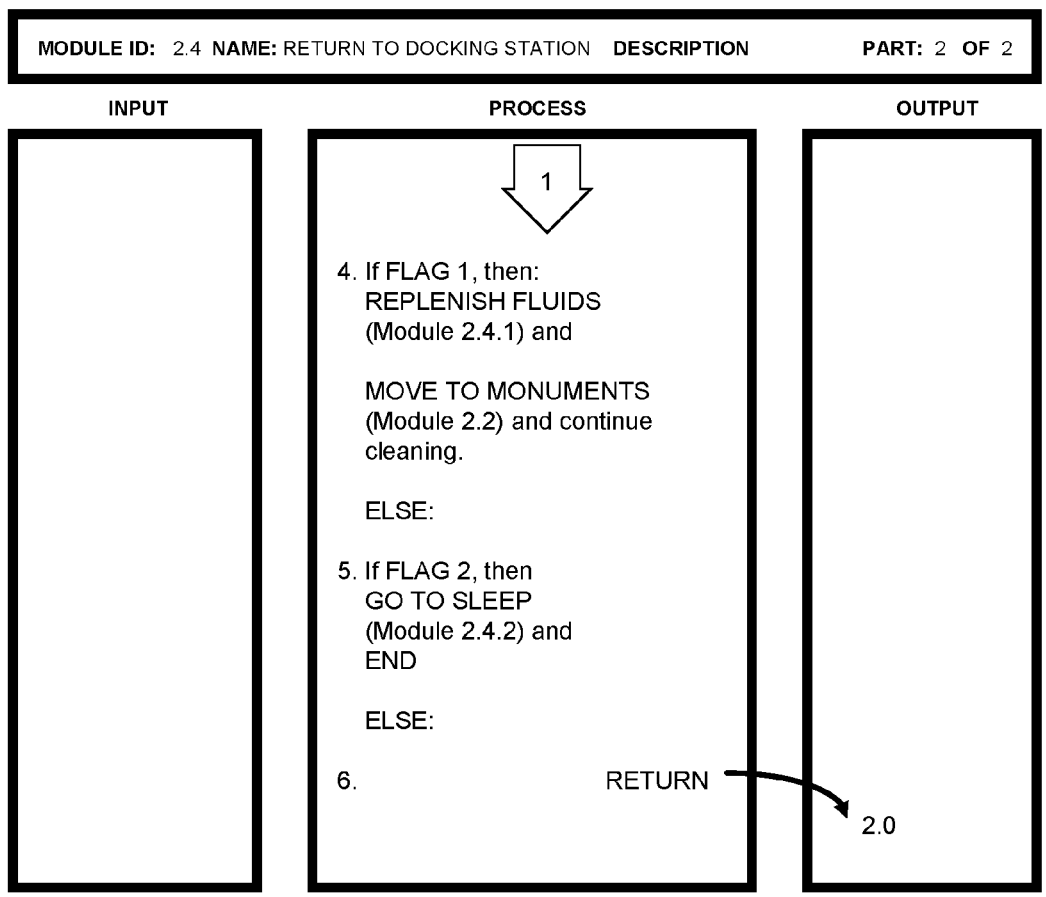

FIG. 18 illustrates the hierarchy of the NAVIGATION module (Module 2.0). This module must perform four major tasks:

2.1 IDENTIFY MONUMENTS,
2.2 MOVE TO MONUMENTS,
2.3 OBSTACLE AVOIDANCE, and
2.4 RETURN TO DOCKING STATION.

The NAVIGATION module controls the traversing movement of the robot through its environment. As discussed previously, traversal to a start position (the point in two-dimensional space where cleaning or maintenance can begin) requires instructions telling the robot how to get to the start position. These instructions may be input manually through a keypad or using a mouse. However, it can also navigate to monuments that are placed within the environment. Usually such navigation will be done via a sequence of movements that require several monuments. For example, the robot may be in one room, and the target objects may be several rooms away. The robot needs to know how to move through the rooms in sequence in order to arrive at the prescribed area. In doing this, the robot needs to avoid bumping into obstacles positioned either permanently or temporarily in the robot's path. Finally, once cleaning or maintenance is complete, the robot returns to the docking station.

Examination of the drawing of Module 2.4 reveals a black right triangle in the upper right corner of the rectangle illustrating that module. The black triangle is a standard HIPO notation indicating that the module is a self-contained routine that is invoked by more than one software module.

Module 2.4, i.e., RETURN TO DOCKING STATION, has two main functions. First, it instructs the robot to replenish fluids, and then it instructs the robot to go to sleep.

FIG. 19 through FIGS. 23A and 23B are IPO charts illustrating the programming of the NAVIGATION Module 2.0.

Figure 24:
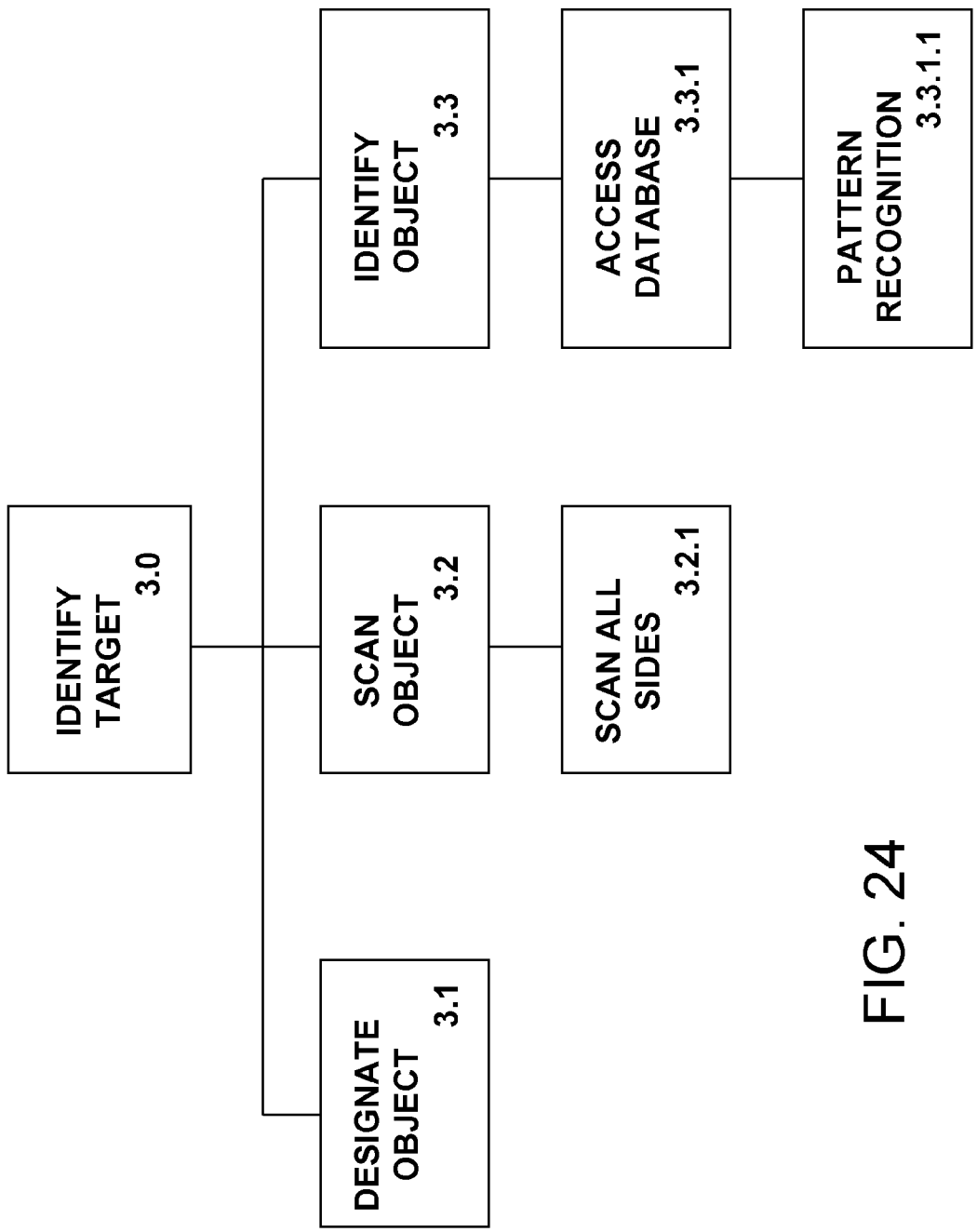
FIG. 24 illustrates the hierarchy of the IDENTIFY TARGET software module and its sub-modules of FIG. 14.
Figure 25:
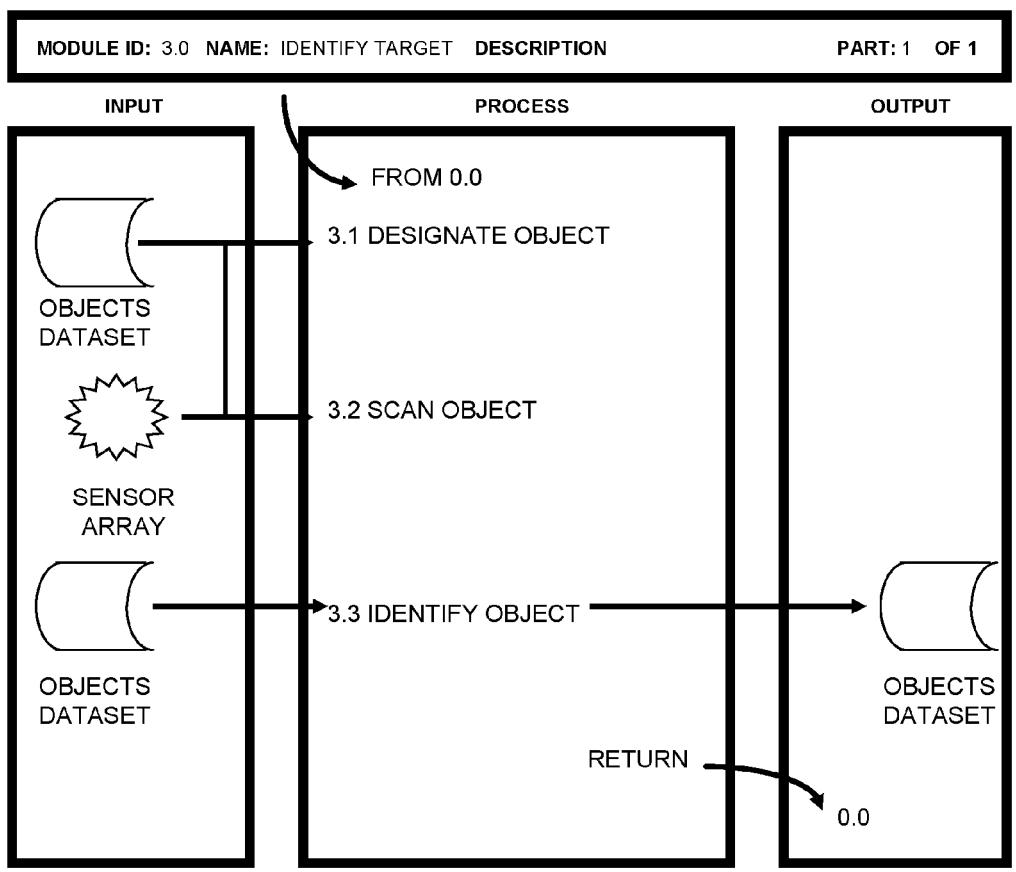
FIG. 25 is an IPO Chart of the IDENTIFY TARGET software module.
Figure 26:
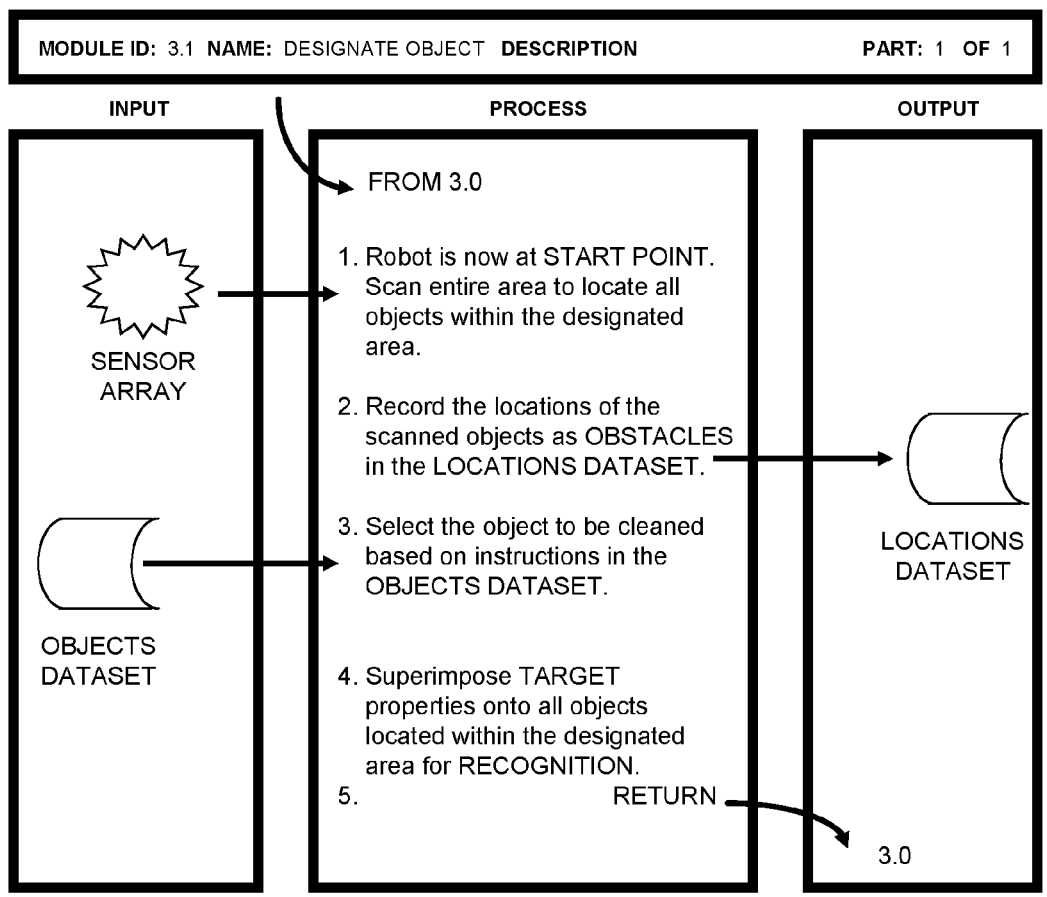
FIG. 26 is an IPO Chart of the DESIGNATE OBJECT software module, which is a sub-module of IDENTIFY TARGET.
Figure 27:
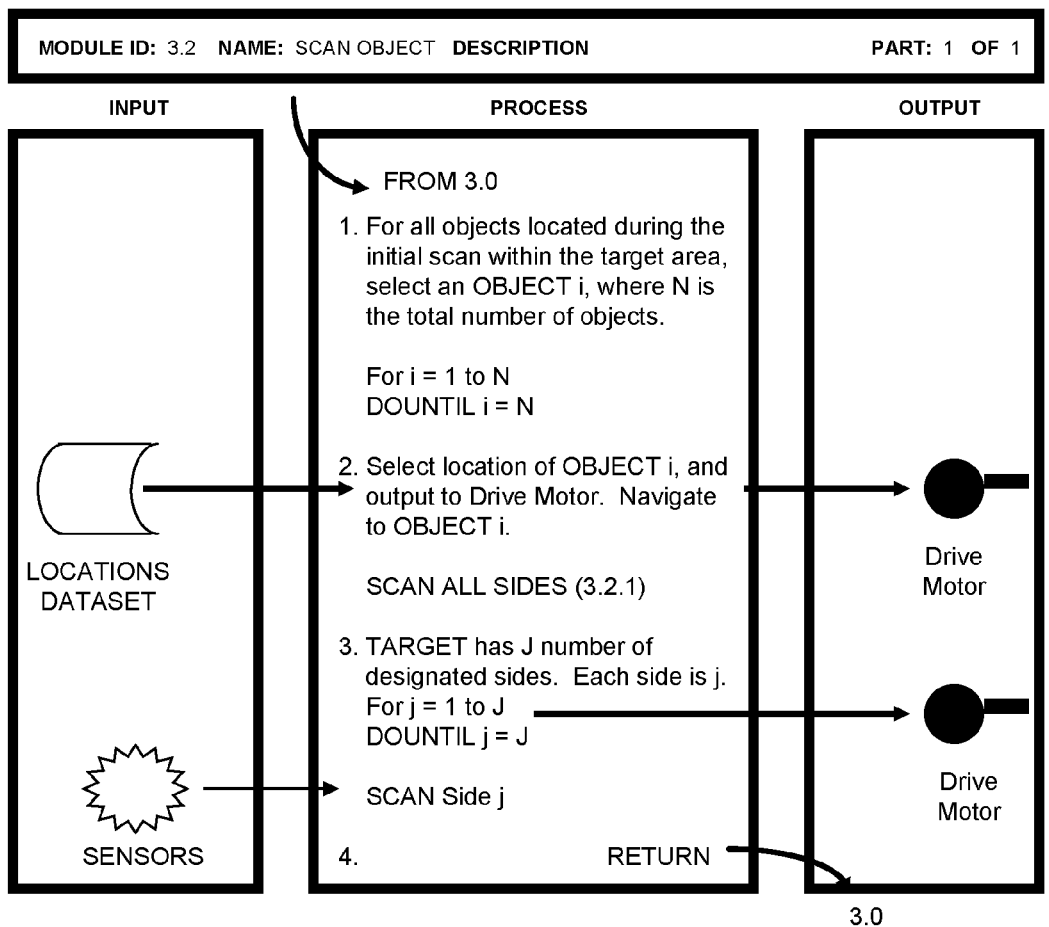
FIG. 27 is an IPO Chart of the SCAN OBJECT software module, which is a sub-module of IDENTIFY TARGET
Figure 28:
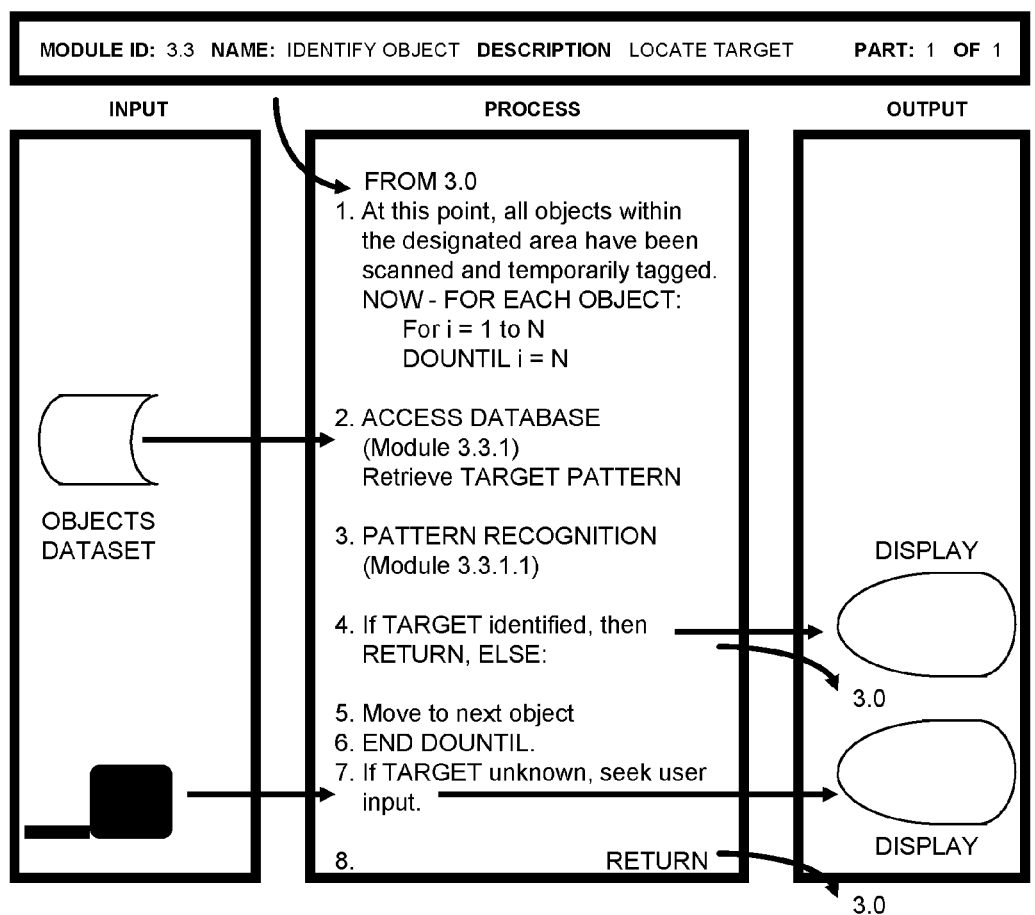
FIG. 28 is an IPO Chart of the IDENTIFY OBJECT software module, which is a sub-module of IDENTIFY TARGET.

FIG. 24 illustrates the IDENTIFY TARGET software module (Module 3.0), which has the three functions of selecting the objects to be cleaned or maintained, scanning them using the robot's various sensors, and identifying the object (e.g., whether it is an automobile [a Corvette or a Cadillac], a motorcycle, or the side of a barn). The scanning software instructs the scanning mechanism to scan every aspect of the object from every angle. Identification of the object takes place by accessing an extensive database of objects, performing pattern recognition of the actual object, and comparing the recognized pattern with the entry in the database. The software used for pattern recognition can be state-of-the-art software currently available on the market. However, custom software may also be used for this purpose.

FIG. 25 through FIG. 28 are IPO charts illustrating the programming of the IDENTIFY TARGET Module 3.0

Figure 29:
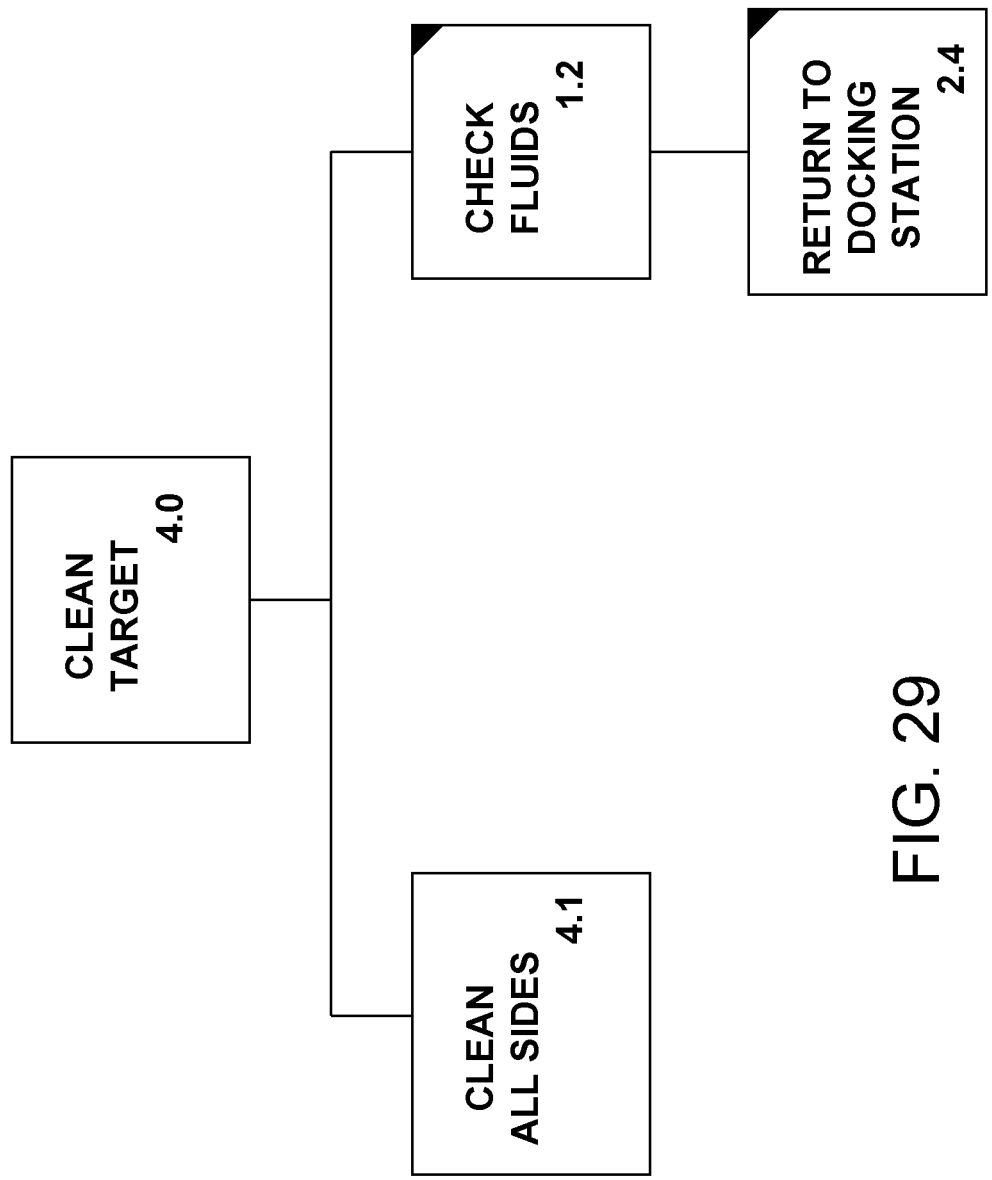
FIG. 29 illustrates the hierarchy of the CLEAN TARGET software module and its sub-modules of FIG. 14.

FIG. 29 illustrates the CLEAN TARGET software module (Module 4.0). This program provides instructions to the robot regarding how to clean or maintain the specific target object identified with the IDENTIFY TARGET software. The IDENTIFY TARGET software scans all aspects (or sides) of the target object. The CLEAN TARGET software instructs the robot to clean or maintain all sides of the target as denoted by the scans. During the cleaning process, the system constantly checks all fluid levels. At certain preset fluid levels, the robot might suspend cleaning and return to the docking station for replenishment. Once the fluids have been replenished, the robot will return to the prescribed area and complete the cleaning process. Finally, after cleaning is complete, the robot returns to the docking station.

Note that Modules 1.2 (CHECK FLUIDS) and Module 2.1 (RETURN TO DOCKING STATION) are reusable as signified by the black triangles appearing in their upper right corners, and are invoked by Module 4.0.

Figure 30:
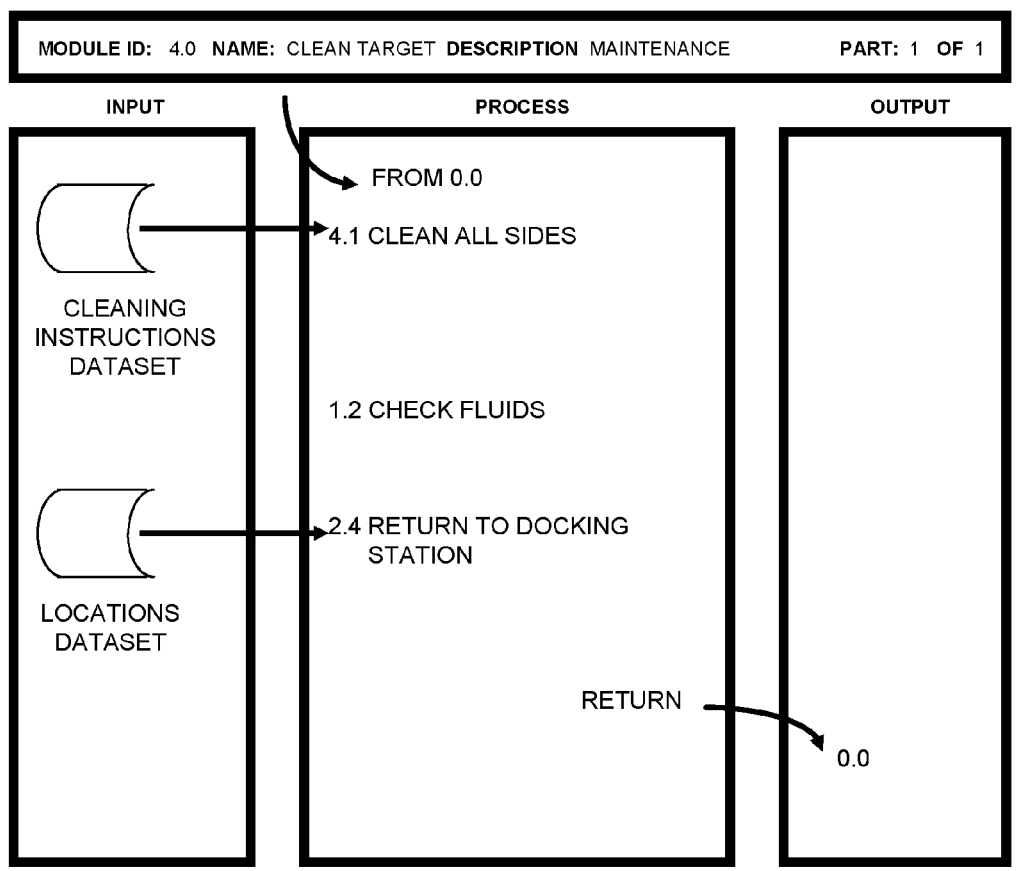
FIG. 30 is an IPO Chart of the CLEAN TARGET software module.
Figure 31:
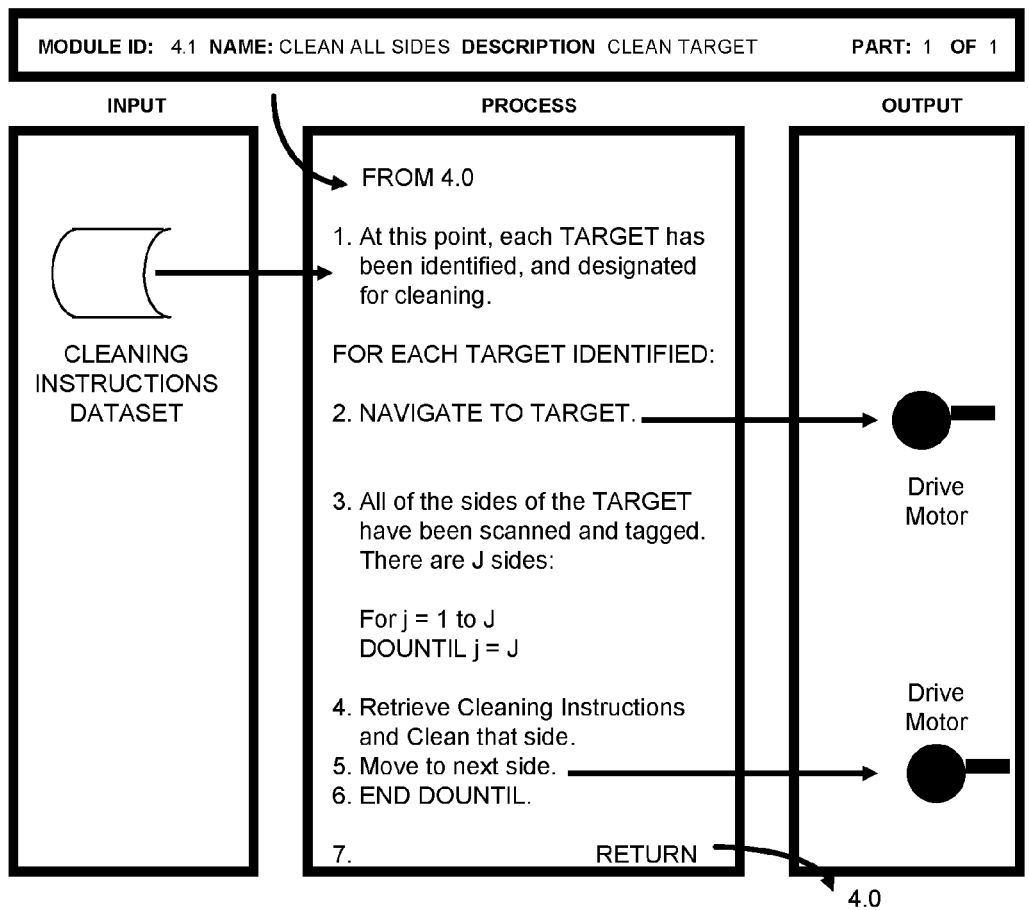
FIG. 31 is an IPO Chart of the CLEAN ALL SIDES software module, which is a sub-module of CLEAN TARGET.

FIG. 30 is an IPO chart illustrating the CLEAN TARGET Module 4.0. FIG. 31 is an IPO chart illustrating the CLEAN ALL SIDES Module 4.1. IPO charts for Modules 1.2 (CHECK FLUIDS) and Module 2.1 (RETURN TO DOCKING STATION) are not presented here again, as they were originally presented as sub-modules 1.0 and 2.0, respectively.

We claim:

1. A method of autonomously cleaning and maintaining a pre-determined variety of objects located in a prescribed area either indoors or outdoors using a robot comprising computer software or firmware,
    wherein the robot utilizes batteries to generate electricity, dispensers containing fluids to clean the variety of objects, sensors to recognize and identify the variety of objects to be cleaned or maintained, and driver motors to move a multi-segmented arm and to allow the robot to move through a prescribed area, and
    wherein the robot performs the following steps without human interaction:
    a) after receiving a sufficient charge, automatically leaving an external docking station with which the robot is docked;
    b) automatically navigating to the prescribed area;
    c) automatically scanning the prescribed area to find the variety of objects to be cleaned or maintained;
    d) automatically recognizing and identifying each object of the variety of objects to be cleaned or maintained;
    e) automatically cleaning or maintaining each object of the variety of objects to be cleaned or maintained with a movable segmented arm assembly having spray nozzles that spray liquid, and using a set of pre-programmed instructions; and
    f) automatically returning to and mating with the docking station for recharging and replenishment of soap, water, and solvents when all of the variety of objects have been cleaned or maintained; and
    wherein, prior to leaving the external docking station, the robot software or firmware:
    g) automatically determines the electric charge level of the batteries;
    h) automatically determines the level of fluids in the dispensers;
    i) automatically determines whether the sensors are operating properly; and
    j) automatically determines whether the driver motors are operating properly,
    and wherein,
        i) if the electric charge level of all the batteries are below preset desired levels in a database; or
        ii) if the levels of all fluids in the dispensers are below preset desired levels in the database; or
        iii) if all the sensors are not operating properly; or
        iv) if all the driver motors are not operating properly, then the robot's software or firmware will not instruct the robot to leave the external docking station, and an error message will be displayed.

2. The method of claim 1, wherein a plurality of monuments, which are able to be detected by the sensors, are manually placed in positions leading to the prescribed area prior to the robot leaving the external docking station.

3. The method of claim 2, wherein after the robot leaves the external docking station, the software or firmware causes the robot to perform the steps of:
    a) detecting the plurality of monuments;
    b) identifying each of the plurality of monuments;
    c) determining the location of each of the plurality of monuments;
    d) calculating a path from a present position to the location of each of the plurality of monuments a sequence recorded in the database; and
    e) moving to each of the plurality of monuments along the calculated path.

4. The method of claim 3, wherein the software or firmware further causes the robot to perform the steps of detecting and avoiding obstacles while moving in the paths to the plurality of monuments.

5. The method of claim 3, wherein when the robot moves to the last of the plurality of monuments in the sequence, it has arrived at the prescribed area.

6. The method of claim 1, wherein the step of automatically recognizing and identifying each object of the variety of objects to be cleaned or maintained utilizes pattern recognition computer programs contained within the software or firmware.

7. The method of claim 6, wherein the computer software or firmware instructs the robot to use its sensors to scan each object of the variety of objects to be cleaned or maintained from a plurality of viewing positions, such that the scan data from each of the plurality of viewing positions is representative of a side of the particular object to be cleaned or maintained.

8. The method of claim 7, wherein the automatic cleaning or maintaining each of the variety of objects is accomplished by cleaning or maintaining all of the plurality of sides of said object.

9. The method of claim 8, wherein once cleaning or maintaining has begun, the software or firmware periodically and automatically performs the step of determining the level of fluids in the dispensers.

10. The method of claim 9, wherein should the level of fluid in any dispenser fall below a preset desired level in the database, the software or firmware will automatically cause the robot to perform the steps of:
   a) returning to the docking station;
   b) replenishing the fluid in the dispenser to said desired level;
   c) returning to the prescribed area; and
   d) completing its cleaning or maintenance of all of the variety of objects to be cleaned or maintained.

11. A system for autonomously cleaning and maintaining a pre-determined variety of objects located in a prescribed area either indoors or outdoors using a robot comprising computer software or firmware, a movable multi-segmented robotic arm assembly, batteries, fluid dispensers, drive motors, and sensors, wherein said system further comprises:
   a) a storage device that stores an electronic database containing entries capable of being represented by numeric descriptors;
   b) a display device;
   c) a device that permits user input; and
   d) a processor programmed to:
      i) determine the charge level in the batteries;
      ii) determine to levels of fluids in the dispensers;
      iii) determine whether the sensors are operating properly;
      iv) cause the drive motors to move the robot in a prescribed path;
      v) cause the robot to move away from an external docking station;
      vi) cause the robot to move to the prescribed area;
      vii) cause the robot to utilize the sensors to scan the prescribed area to find the variety of objects to be cleaned or maintained;
      viii) recognize and identify each object of the variety of objects to be cleaned or maintained;
      ix) cause each object of the variety of objects to be cleaned or maintained with the movable multi-segmented arm assembly having spray nozzles that spray liquid, and using a set of pre-programmed instructions; and
      x) cause the robot to return to and mate with the docking station for recharging and replenishment of soap, water, and solvents when all of the variety of objects have been cleaned or maintained.

12. The system of claim 11, wherein the robot utilizes batteries to generate electricity, dispensers containing fluids to clean the variety of objects, sensors to recognize and identify the variety of objects to be cleaned or maintained, and driver motors to move the multi-segmented arm and to allow the robot to move through the prescribed area.

13. The system of claim 12 wherein, prior to leaving the external docking station, the processor:
   a) automatically determines the electric charge level of the batteries;
   b) automatically determines the level of fluids in the dispensers;
   c) automatically determines whether the sensors are operating properly; and
   d) automatically determines whether the driver motors are operating properly,
   wherein,
      i) if the electric charge level of all the batteries are below preset desired levels in a database; or
      ii) if the levels of all fluids in the dispensers are below preset desired levels in the database; or
      iii) if all the sensors are not operating properly; or
      iv) if all the driver motors are not operating properly, then the processor will not instruct the robot to leave the external docking station, and will cause an error message to be displayed.

14. The system of claim 13,
   wherein the robot utilizes a plurality of monuments to be detected by the sensors;
   wherein said plurality of monuments are manually placed in positions leading to the prescribed area prior to leaving the external docking station; and
   wherein after the robot leaves the external docking station, the processor causes the robot to:
      a) detect the plurality of monuments;
      b) identify each of the plurality of monuments;
      c) determine the location of each of the plurality of monuments;
      d) calculate a path from a present position to the location of each of the plurality of monuments, via a sequence recorded in the database; and
      e) move to each of the plurality of monuments along the calculated path.

15. The system of claim 14, wherein the processor further causes the robot to navigate to the prescribed area by detecting and avoiding obstacles while moving along the prescribed path to the plurality of monuments in sequence until it reaches the last of the plurality of monuments in the sequence.

16. The system of claim 11, wherein the processor utilizes pattern recognition computer software to identify each object and the variety of objects to be cleaned or maintained.

17. The system of claim 16, wherein the processor instructs the robot to use its sensors to scan each object of the variety of objects to be cleaned or maintained from a plurality of viewing positions, such that the scan data from each of the plurality of viewing positions is representative of a side of a particular object to be cleaned or maintained.

18. The system of claim 17, wherein the automatic cleaning or maintaining each of the variety of objects is accomplished by cleaning or maintaining all of the plurality of sides of said object.

19. The system of claim 18, wherein once cleaning or maintaining has begun, the processor periodically and automatically determines the level of fluids in the dispensers.

20. The system of claim 19, wherein should the level of fluid in any dispenser fall below a preset desired level in the database, the processor will automatically cause the robot to:
   a) return to the docking station;
   b) replenish the fluid in the dispenser to said desired level;
   c) return to the prescribed area; and
   d) complete its cleaning or maintenance of all of the variety of objects to be cleaned or maintained.

21. A system for autonomously cleaning and maintaining a pre-determined variety of objects located in a prescribed area either indoors or outdoors using a robot comprising computer software or firmware, a movable multi-segmented robotic arm assembly, batteries, fluid dispensers, drive motors, and sensors, wherein said system further comprises:
   a) a means for storing an electronic database containing entries capable of being represented by numeric descriptors;

b) a display means;
c) a means for permitting user input; and
d) a means for electronically:
   i) determining the charge level in the batteries;
   ii) determining to levels of fluids in the dispensers;
   iii) determining whether the sensors are operating properly;
   iv) causing the drive motors to move the robot in a prescribed path;
   v) causing the robot to move away from an external docking station;
   vi) causing the robot to move to a prescribed area;
   vii) causing the robot to utilize the sensors to scan the prescribed area to find the variety of objects to be cleaned or maintained;
   viii) recognizing and identifying each object of the variety of objects to be cleaned or maintained;
   ix) causing each object of the variety of objects to be cleaned or maintained with the movable multi-segmented arm assembly having spray nozzles that spray liquid, and using a set of pre-programmed instructions; and
   x) causing the robot to return to and mate with the docking station for recharging and replenishment of soap, water, and solvents when all of the variety of objects have been cleaned or maintained.

* * * * *